(12) United States Patent
Kirsch et al.

(10) Patent No.: US 7,914,859 B2
(45) Date of Patent: Mar. 29, 2011

(54) MESOGENIC COMPOUNDS, LIQUID CRYSTAL MEDIUM AND LIQUID CRYSTAL DISPLAY

(75) Inventors: Peer Kirsch, Kanagawa (JP); Gerald Unger, Weiterstadt (DE); Andreas Ruhl, Rossdorf (DE); Michael Heckmeier, Hemsbach (DE); Peter Best, Darmstadt (DE); John Patrick, Warham (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/814,631

(22) PCT Filed: Dec. 22, 2005

(86) PCT No.: PCT/EP2005/013860
§ 371 (c)(1),
(2), (4) Date: Jul. 24, 2007

(87) PCT Pub. No.: WO2006/079406
PCT Pub. Date: Aug. 3, 2006

(65) Prior Publication Data
US 2008/0116419 A1    May 22, 2008

(30) Foreign Application Priority Data
Jan. 25, 2005 (EP) .................................... 05001439

(51) Int. Cl.
*C09K 19/12* (2006.01)
*C09K 19/30* (2006.01)
*C09K 19/34* (2006.01)
*C09K 19/54* (2006.01)

(52) U.S. Cl. .................. 428/1.1; 252/299.01; 252/299.5; 252/299.61; 252/299.63; 252/299.66; 252/299.67

(58) Field of Classification Search ............. 252/299.01, 252/299.61, 299.62, 299.63, 299.66, 299.67, 252/299.5; 428/1.1, 1.3
See application file for complete search history.

(56) References Cited

U.S. PATENT DOCUMENTS

| 4,818,076 | A * | 4/1989 | Heppke et al. ................ 349/167 |
| 6,569,504 | B1 | 5/2003 | Walba et al. |
| 2004/0150633 | A1 | 8/2004 | Heckmeier et al. |
| 2006/0050354 | A1* | 3/2006 | Heckmeier et al. ............ 359/245 |

FOREIGN PATENT DOCUMENTS

| DE | 102 17 273 A1 | 12/2002 |
| WO | WO 2004/016673 A | 2/2004 |
| WO | WO 2004/046805 A | 6/2004 |
| WO | WO 2005/105952 A | 11/2005 |

OTHER PUBLICATIONS

CAPLUS 1993: 483351.*
Ferreira et al., "On the Origin of the Plateau in Surface-Pressure Isotherms of Aromatic Carboxylic Acids", Journal of Physical Chemistry B (2002), 106(40), 10395-10400.*
CAPLUS 2002: 671103.*
Pugh et al., "Columnar mesophases of cyclic trimers of disubstituted acetylenes", Journal of Materials Chemistry (1991), 1(5), pp. 765-773.*
CAPLUS 1992:245629.*
CAPLUS 1966: 477901.*
CAPLUS 1977: 468477.*
Hattori et al., "1-Arylfluorenols: Convenient Preparation via the Ester-Mediated Nucleophilic Aromatic Substitution Protocol, Facile Racemization, and Intrinsic Chiral Induction Ability", Chirality 10:619-626 (1998).*
CAPLUS 1995:520287.*
Hiroyuki Matsuzaki et al., New Mesogenic Compounds With Unconventional Molecular Structures/1, 2-Phenylene and 2, 3-Naphthylene BIS (4-(4-Alkoxyphenyliminomethyl) Benzoates) and related compounds, Liquid Crystals, Jan. 1993, pp. 105-120, Issn: 0267-8292, Taylor and Francis Abingdon, GB.

(Continued)

*Primary Examiner* — Shean C Wu
(74) *Attorney, Agent, or Firm* — Millen, White, Zelano & Branigan, P.C.

(57) ABSTRACT

The instant invention relates to mesogenic media comprising one or more compounds which comprise two or more mesogenic groups two of which are linked to the ortho-positions of an aromatic ring, preferably of formula (I) wherein the parameters are as specified in the text, preferably the instant invention relates to mesogenic media showing a blue phase and their use in electro-optical light modulation elements and their respective use in displays, as well as to such devices. The instant invention further relates to compounds of formula (I).

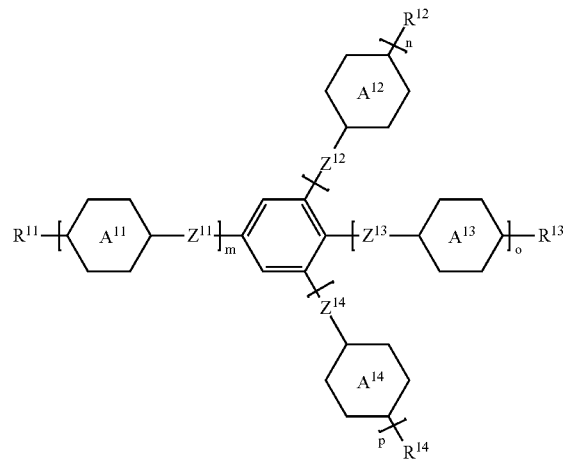

7 Claims, No Drawings

OTHER PUBLICATIONS

Kuboshita M. et al., Mesomorphic Behavior of 1, 2-Phenylene BIS(4-(4-Alkoxybenzylideneamino)Benzoates), Molecular Crystals and Liquid Crystals, Inc. Nonlinear Optics, May 1, 1991, pp. 319-326, vol. 199, Gordon and Breach Science Publishers, Reading GB.

Attard G. S. et al., U-shaped Dimeric Liquid Crystals Derived From Phthalic Acid, Liquid Crystals, Mar. 1997, pp. 349-358, vol. 22, No. 3, Issn. 0267-8292, Taylor and Francis, Abingdon, GB.

Yelamaggad C. V. et al., Bent-Core V-Shaped Mesogens Consisting of Salicylaldimine Mesogenic Segments: Synthesis and Characterization of Mesomorphic Behaviour, Liquid Crystals, Jul. 2004, pp. 1027-1036, vol. 31, No. 7, Issn. 0267-8292, Taylor and Francis, Abingdon, GB.

Vora R. A. et al., Mesogenic Properties and The Effect of 1, 2, 4-Trisubstitution on the Central Benzene Nucleus of A Three-Ring Mesogen, Liquid Crystals, Jul. 2001, pp. 983-989, Issn. 0267-8292, Taylor and Francis, Abingdon, GB.

Canlet CV. et al., Laterally Dibenzyloxy-Branced Nematogens with Large Nematic Range and Rich Solid Polymorphism, Liquid Crystals, Apr. 2000, pp. 635-641, vol. 27, No. 5, Issn. 0267-8292, Taylor and Francis, Abingdon, GB.

* cited by examiner

MESOGENIC COMPOUNDS, LIQUID CRYSTAL MEDIUM AND LIQUID CRYSTAL DISPLAY

FIELD OF THE INVENTION

The present invention relates to mesogenic compounds, liquid crystal media comprising these compounds and to electro-optical displays comprising these mesogenic media as light modulation media, in particular to displays which are operated at a temperature at which the mesogenic modulation media are in an optically isotropic phase, preferably in a blue phase.

PROBLEM TO BE SOLVED AND STATE OF THE ART

Electro-optical displays and mesogenic light modulation media, which are in the isotropic phase when being operated in the display are described in DE 102 17 273 A. Electro-optical displays, and mesogenic light modulation media, which are in the optically isotropic blue phase, when being operated in the display are described in WO 2004/046 805.

The mesogenic media and displays described in these references provide several significant advantages compared to well-known and widely used displays using liquid crystals in the nematic phase, like for example liquid crystal displays (LCDs) operating in the twisted nematic (TN)-, the super twisted nematic (STN)-, the electrically controlled birefringence (ECB)-mode with its various modifications and the in-plane switching (IPS)-mode. Amongst these advantages are most pronounced their much faster switching times, and significantly wider optical viewing angle.

Whereas, compared to displays using mesogenic media in another liquid crystalline phase, as e.g. in the smectic phase in surface stabilized ferroelectric liquid crystal displays (SSF LCDs), the displays of DE 102 17 273.0 and WO 2004/046 805 are much easier to be produced. For example, they do not require a very thin cell gap in the first place and the electro-optical effect is not very sensitive to small variations of the cell gap as well.

However, the liquid crystal media described in these mentioned patent applications still require operating voltages, which are not low enough for some applications. Further the operating voltages of these media vary with temperature, and it is generally observed, that at a certain temperature the voltage dramatically increases with increasing temperature. This limits the applicability of liquid crystal media in the blue phase for display applications. A further disadvantage of the liquid crystal media described in these patent applications is their moderate reliability which is insufficient for very demanding applications. This moderate reliability may be for example expressed in terms of the voltage holding ratio parameter (VHR), which in liquid crystal media as described above may be below 90%.

Some compounds and compositions have been reported which possess a blue phase between the cholesteric phase and the isotropic phase and can usually be observed by optical microscopy. These compounds or compositions for which the blue phases are observed are typically single mesogenic compounds or mixtures showing a high chirality. However, generally the blue phases observed only extend over a very small temperature range, which is typically less than 1 degree centigrade wide, and/or the blue phase is located at rather inconvenient temperatures.

In order to operate the novel fast switching display mode of WO 2004/046 805 the light modulation medium to be used has to be in the blue phase over a broad range of temperatures encompassing ambient temperature, however. Thus, a light modulation medium possessing a blue phase which is as wide as possible and conveniently located is required.

Therefore there is a strong need for a modulation medium with a blue phase with a wide phase range, which may be achieved either by an appropriate mixture of mesogenic compounds themselves or, preferably by mixing a host mixture with appropriate mesogenic properties with a single dopant or a mixture of dopants that stabilises the blue phase over a wide temperature range.

Summarizing, there is a need for liquid crystal media, which can be operated in liquid crystal displays which are operated at temperatures where the media is in the blue phase, which provide the following technical improvements:
a reduced operating voltage,
a reduced temperature dependency of the operating voltage and
an improved reliability, e.g. VHR.

PRESENT INVENTION

Surprisingly, it now has been found that mesogenic media comprising one or more compounds comprising two or more mesogenic groups, two of which are bound to the ortho positions of an aromatic ring, preferably of a benzene ring, in which one or two non-adjacent =CH— groups may be replaced by N and which optionally may further be substituted, allow to enhance the width of the blue phase in respective media or lead to a decreased temperature dependence of the electro-optical response or an increase of the range of temperatures over which the temperature dependence is negligible or a to a combination of two or of all three of these effects.

In a preferred embodiment of the present invention the compounds used according to the present invention are chiral compounds, preferably they comprise at least one chirally substituted atom and most preferably a chirally substituted C-atom.

In a preferred embodiment of the present invention the compounds with at least two mesogenic groups bound to the ortho positions of an aromatic ring used according to the present invention are compounds of formula I

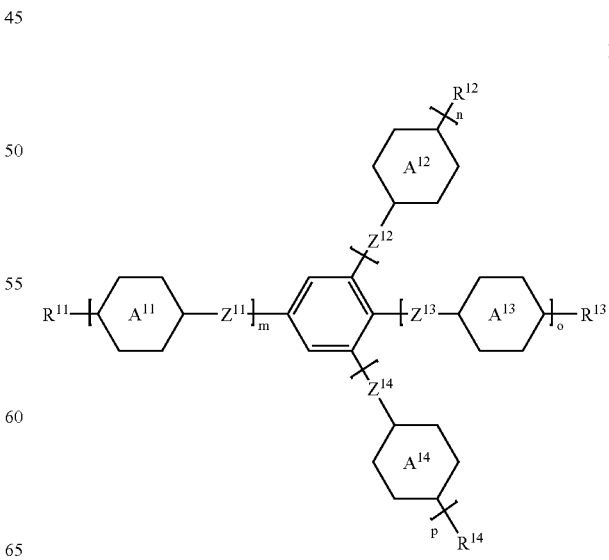

I wherein $R^{11}R^{12}$, $R^{13}$ and $R^{14}$ are, independently of each other, H, F, Cl, CN, NCS, $SF_5$, $SO_2CF_3$ or alkyl, which is straight chain or branched, preferably has 1 to 20 C-atoms, is unsubstituted, mono- or poly-substituted by F, Cl, or CN, and in which one or more non-adjacent $CH_2$ groups are optionally replaced, in each case independently from one another, by —O—, —S—, —NH—, —$NR^{01}$—, —$SiR^{01}R^{02}$—, —CO—, —COO—, —OCO—, —OCO—O—, —S—CO—, —CO—S—, —$CY^{01}$=$CY^{01}$— or —C≡C— in such a manner that O and/or S atoms are not linked directly to one another, preferably H, Halogen, n-alkyl, n-alkoxy with 1 to 9 C-atoms preferably 2 to 5 C-atoms, alkenyl, alkenyloxy or alkoxyalkyl with 2 to 9 C-atoms, preferably with 2 to 5 C-atoms or CN, NCS, halogen, preferably F, Cl, halogenated alkyl, alkenyl or alkoxy, preferably mono-, di fluorinated or oligofluorinated alkyl, alkenyl or alkoxy, especially preferred $CF_3$, $OCF_2H$ or $OCF_3$, preferably $R^{11}$ is not H or halogen if m is 0,

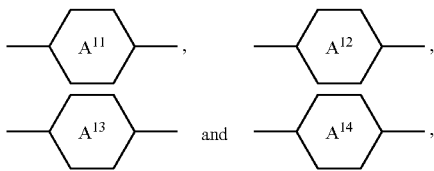

are independently of each other, and, in case one or more of them are occurring more than once, also these are in each occurrence, independently of each other, an aromatic and/or alicyclic ring, or a group comprising two or more fused aromatic or alicyclic rings, wherein these rings optionally contain one or more hetero atoms selected from N, O and/or S, and are optionally monosubstituted or polysubstituted by R, preferably

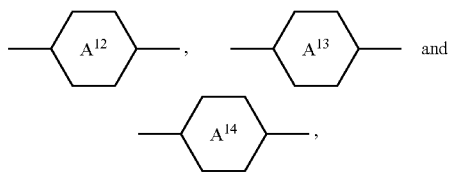

next to the central aromatic ring shown in formula I are an optionally substituted aromatic ring, preferably a phenyl ring, R has the meaning given for $R^{11}$ and preferably is alkyl with 1 to 12 C-atoms, $Z^{11}$, $Z^{12}$, $Z^{13}$ and $Z^{14}$ are, independently of each other, and in case one or more of them are occurring more than once, also these are in each occurrence, independently of each other, —CO—O—, —O—CO—, —S—CO—, —CO—S—, —CO—$NR^{01}$—, —$NR^{01}$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^{01}$—, —$CR^{01}$=CH—, —$CY^{01}$=$CY^{02}$—, —C≡C—, —$(CH_2)_4$—, —CH=CH—CO—O—, —O—CO—CH=CH— or a single bond, preferably at least one of $Z^{11}$ to $Z^{13}$ next to the central aromatic ring is a single bond most preferably $Z^{11}$ and $Z^{12}$ next to the central aromatic ring are a single bond and/or $Z^{13}$ next to the central aromatic ring is a single bond, $Y^{01}$ and $Y^{02}$ are, independently of each other, F, Cl or CN, and alternatively one of them may be H, $R^{01}$ and $R^{02}$ are, independently of each other, H or alkyl with 1 to 12 C-atoms, m is 0, 1, 2, 3 or 4, preferably 1, 2, or 3, n and o are, independently of each other, 1, 2, 3 or 4, preferably 1, 2, or 3, most preferably 1 or 2, and in particular n has the same value as o, and p is 0, 1, 2, 3 or 4, preferably 0, 1, 2 or 3, most preferably 0, 1 or 2, and in particular p is 0 or has the same value as o, whereby preferably m+n+o+p is 2, 3, 4, 5, 6, 7 or 8, preferably 3, 4, 5, or 6 and optionally the central phenyl ring may be substituted once or more times by halogen and/or R, preferably by F and/or $CH_3$, and/or one or two non-adjacent =CH— groups may be replaced by N and chiral compounds of formula I are encompassed too.

Compounds of formula I are also an object of the present application, especially preferred are compounds of formula I wherein the parameters have the following meaning $R^{11}$ is F, Cl, CN, NCS, $CF_3$, $OCF_3$, $SF_5$, alkyl, alkoxy, alkenyl or alkynyl, preferably F, Cl, $CF_3$, $SF_5$, alkyl or alkoxy, and most preferably F, $CF_3$, or $SF_5$, and in particular F,

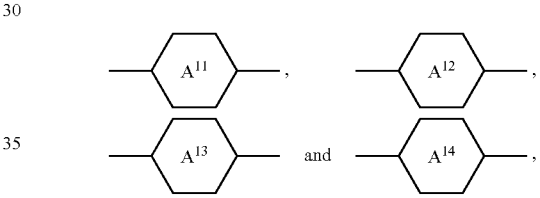

preferably are, independently of each other in each occurrence,

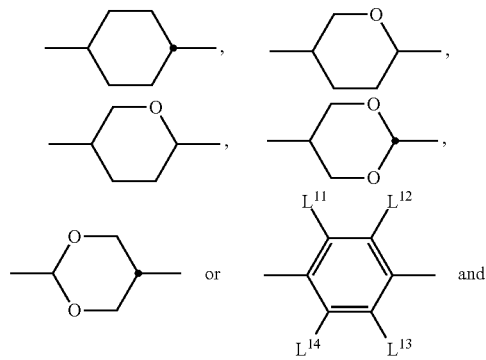

$L^{11}$ to $L^{14}$ are, independently of each other, H or F, preferably two or more, most preferably three or more of them are F, n and m preferably, are independent of one another, 2, or 3, most preferably 2, and optionally the central phenyl ring may be substituted once or more times by halogen and/or R, preferably by F and/or $CH_3$, and/or one or two non-adjacent =CH— groups may be replaced by N and chiral compounds of formula I are encompassed too.

The compounds of formula I according to the present invention are preferably of formula I'

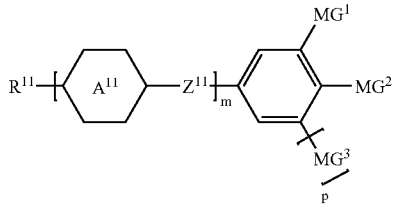

I' wherein the parameters have the respective meanings given under formula I above and $MG^1$, $MG^2$ and $MG^3$ are, independently of each other, MG, and MG in each occurrence, independently of one another, is

wherein $R^{15}$ has the meaning given for $R^{11}$ under formula I above,

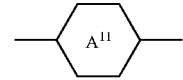

in each occurrence independently of each other, has the meaning given for

under formula I above, $Z^{15}$, in each occurrence independently of each other, has the meaning given for $Z^{11}$ under formula I above and q is 0, 1, 2 or 3. preferably 0, 1 or 2, most preferably 0 or 1.

The compounds of formula I used according to the present invention are preferably selected from the group of sub-formulae I'-1 to I'-6

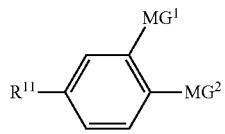

I'-1

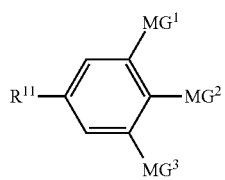

I'-2

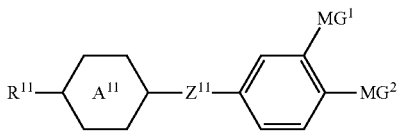

I'-3

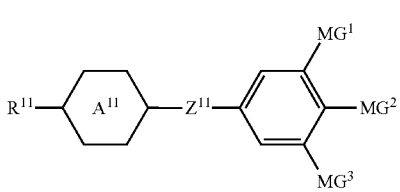

I'-4

I'-5

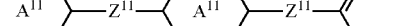

I'-6

wherein the parameters have the respective meanings given above and the central phenyl ring shown optionally may be substituted by halogen, preferably by F, or by alkyl with 1 to 10 C atoms, In a preferred embodiment $MG^1$ and $MG^2$ are identical to each other and, in case p is not 0, preferably also $MG^3$ is identical to $MG^1$.

In another preferred embodiment $MG^1$ and $MG^3$ are identical to reach other and different from $MG^2$.

In yet another preferred embodiment p is 0.

Particularly preferred are compounds of formula I', wherein at least one of $Z^5$ in at least one of $MG^1$, MG and $MG^3$, preferably at least one of $Z^{13}$ in each of $MG^1$ and $MG^2$, and most in each of $MG^1$, $MG^2$ and $MG^3$ is selected from —CO—O—, —O—CO—, —CH$_2$—O—, —O—CH$_2$—, —CF$_2$—O—, —O—CF$_2$— or —CH=CH—, most preferably from —CF$_2$—O— or —O—CF$_2$—, and/or one or more of the rings $A^{11}$ and/or $A^{12}$, and/or $A^{13}$, which are present, is, respectively are, phenylene, that is optionally substituted by one or more groups R and/or F-atoms and/or $R^{11}$ and $R^{12}$ are alkyl with 1 to 12, preferably 1 to 8 C-atoms, or alkenyl or alkynyl with 2 to 12, preferably 2 to 7 C-atoms and/or $R^{13}$ is H or alkyl with 1 to 12, preferably 1 to 8 C-atoms, or alkenyl or alkynyl with 2 to 12, preferably 2 to 7 C-atoms.

Preferably $MG^1$ and $MG^2$, and if present $MG^3$, are selected from

Alkyl, Oxaalkyl, Alkenyl and Oxaalkenyl, wherein one or more H atoms may be replaced by F, —(O)$_{0,1}$(CH$_2$)$_{2-12}$OCOCH=CH$_2$, —(O)$_{0,1}$(CH$_2$)$_{2-12}$OCOCCH$_3$=CH$_2$, —(O)$_{0,1}$(CH$_2$)$_{2-12}$OCH=CH$_2$,

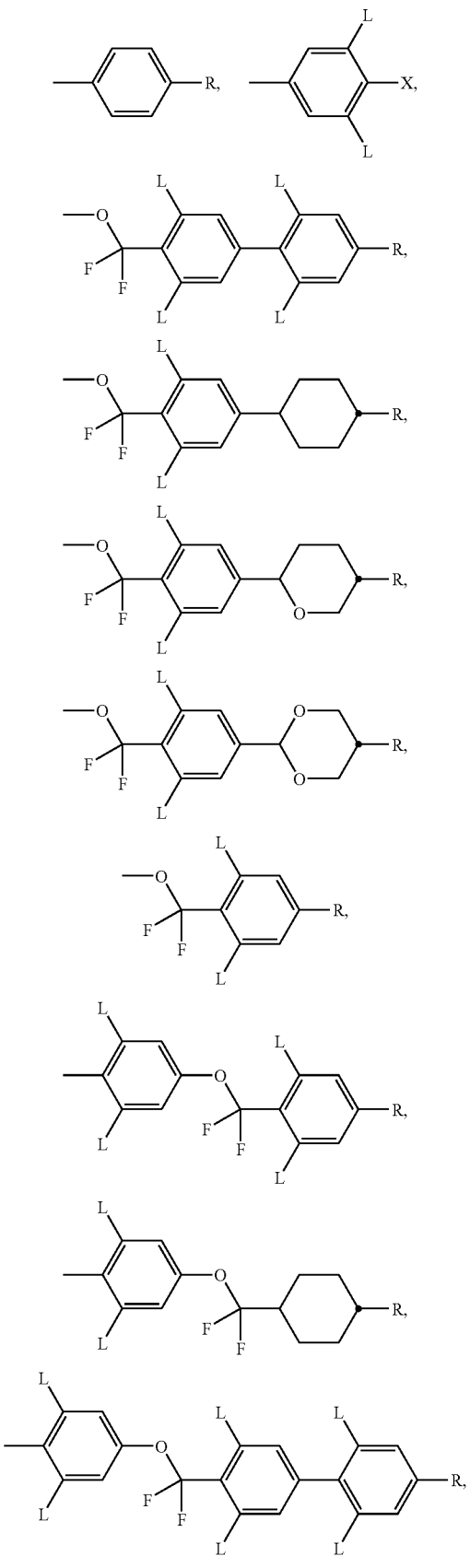
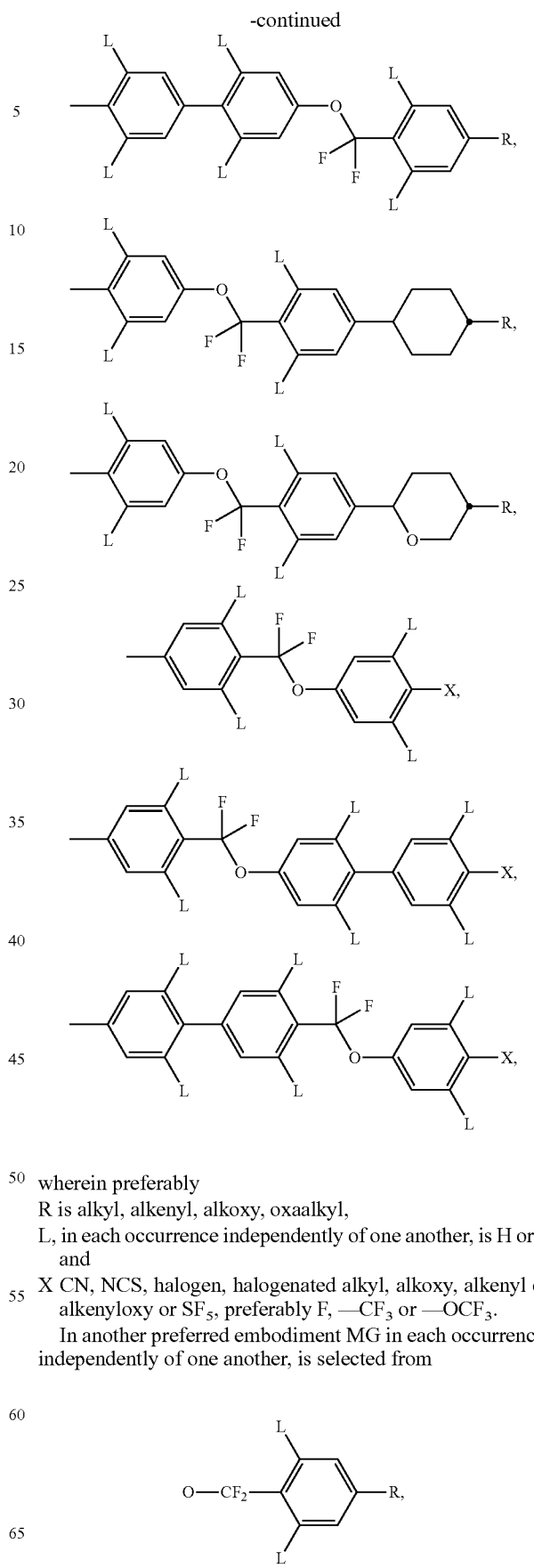
wherein preferably
R is alkyl, alkenyl, alkoxy, oxaalkyl,
L, in each occurrence independently of one another, is H or F and
X CN, NCS, halogen, halogenated alkyl, alkoxy, alkenyl or alkenyloxy or SF$_5$, preferably F, —CF$_3$ or —OCF$_3$.
In another preferred embodiment MG in each occurrence, independently of one another, is selected from

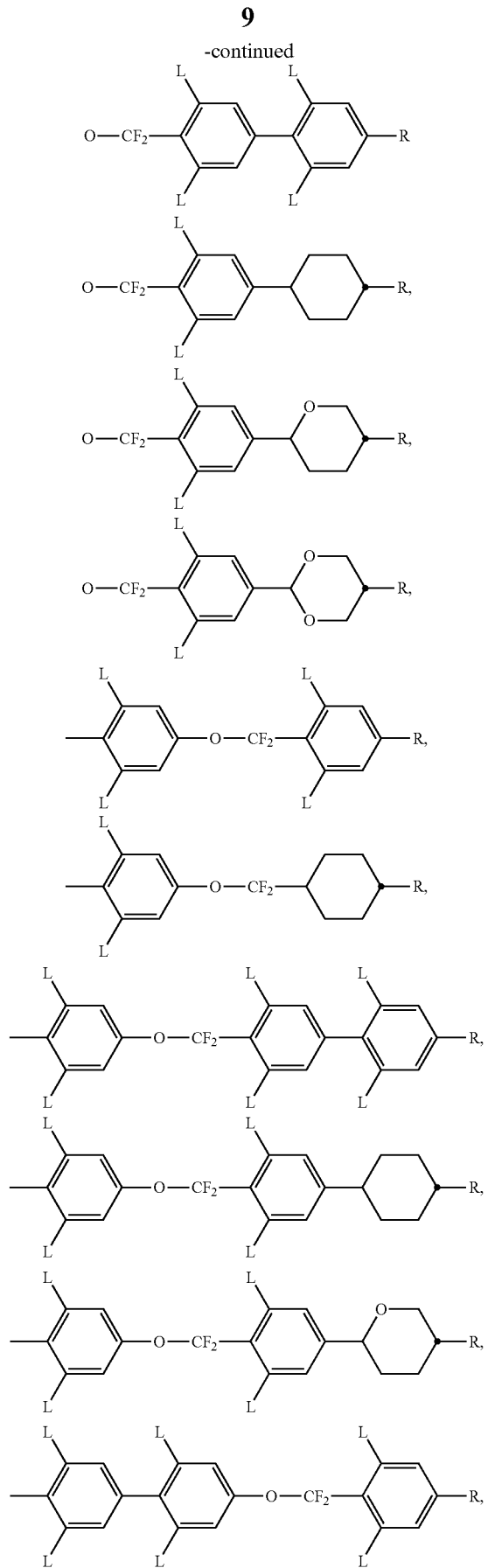

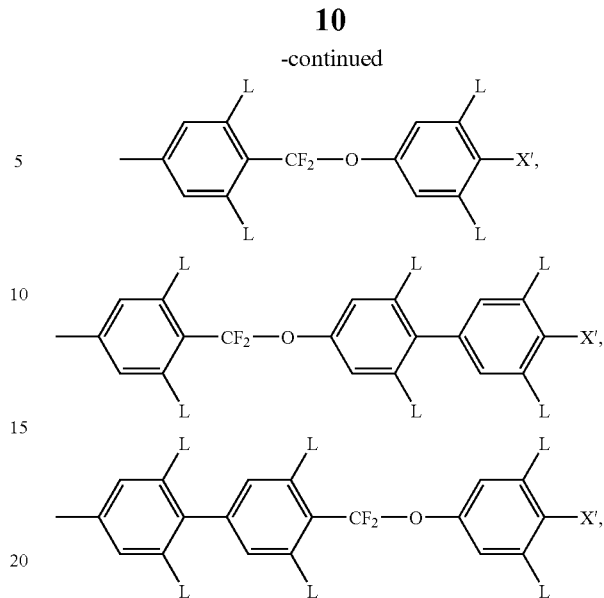

wherein the parameters have the respective meanings given above and preferably

L represents, in each occurrence independently of one another, H or F, preferably one or more, more preferably two or more of L are F, X' is F, $CF_3$, $OCF_3$, $OCHF_2$, $SF_5$ or CN, and R is alkyl with 1 to 12 C atoms or alkenyl or alkyloxyalkyl each with 2 to 12 C atoms.

In a preferred embodiment of the present invention rings $A^{11}$ to $A^{14}$ are, independently of each other, an aromatic or alicyclic ring, preferably a 5-, 6- or 7-membered ring, or a group comprising two or more, preferably two or three, fused aromatic or alicyclic rings, wherein these rings optionally contain one or more hetero atoms selected from N, O and/or S, and are optionally mono- or polysubstituted with L, wherein L is F, Cl, Br, CN, OH, $NO_2$, and/or an alkyl, alkoxy, alkylcarbonyl or alkoxycarbonyl group with 1 to 12 C atoms, wherein one or more H atoms are optionally replaced by F or Cl.

L is preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$, in particular F, Cl, CN, $CH_3$, $C_2H_5$, $OCH_3$, $COCH_3$ or $OCF_3$, most preferably F, Cl, $CH_3$, $OCH_3$ or $COCH_3$.

Preferred rings $A^{11}$ to $A^{14}$ are for example furane, pyrrol, thiophene, oxazole, thiazole, thiadiazole, imidazole, phenylene, cyclohexylene, cyclohexenylene, pyridine, pyrimidine, pyrazine, azulene, indane, naphthalene, tetrahydronaphthalene, decahydronaphthalene, tetrahydropyrane, anthracene, phenanthrene and fluorene.

Particularly preferably one or more of these rings $A^{11}$ to $A^{14}$ is, respectively are, selected from furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, or 1,4-cyclohexylene wherein one or two non-adjacent $CH_2$ groups are optionally replaced by O and/or S, wherein these groups are unsubstituted, mono- or polysubstituted by L as defined above.

Preferably

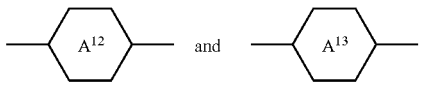

and, if present,

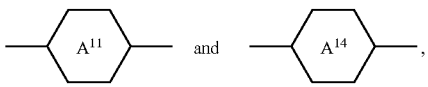

, independently of each other in each occurrence, are

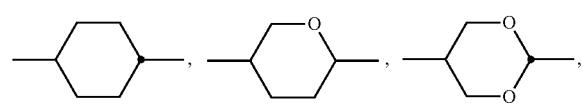

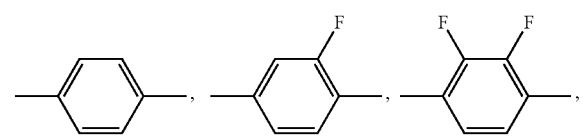

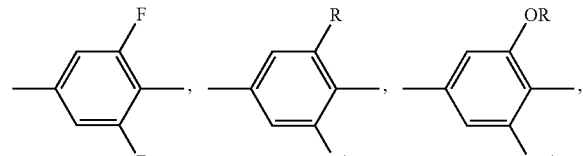

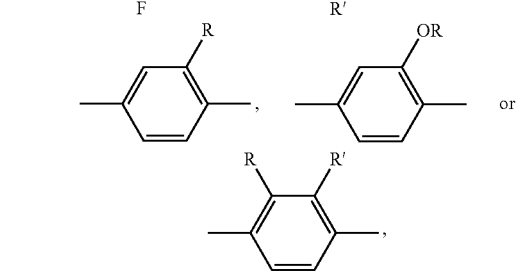

wherein

R and R' have, independently of each other the meaning given above for R, preferably for $R^{11}$ and most preferably are, independently of each other, alkyl with 1 to 12 C-atoms, preferably with 1 to 7 C-atoms, or alkenyl or alkinyl with 2 to 12 C-atoms, preferably with 2 to 7 C-atoms, in both of which one or more non-adjacent —$CH_2$— groups, not adjacent to the phenyl ring, may be replaced by —O— and/or —CH=CH— and/or one or more H-atoms may be replaced by halogen, preferably by F and preferably is alkyl, preferably methyl, ethyl or propyl, preferably methyl, in a preferred embodiment R and R' are identical to each other, or their mirror images and most preferably at least one of them, in particular at least one each of them, is

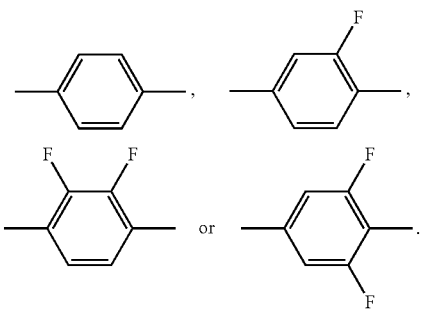

In a preferred embodiment of the present invention at least one of the groups

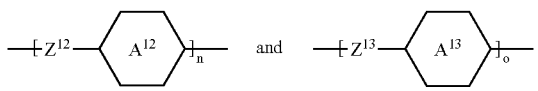

and, if present,

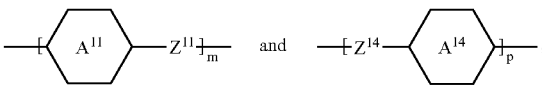

contains, preferably all of them contain only monocyclic rings $A^{11}$, $A^{12}$, $A^{13}$ and $A^{14}$. Very preferably this is a group/these are groups containing one, two or three 5- and/or 6-membered rings.

Preferred sub-formulae for these groups are listed below. For reasons of simplicity, Phe in these groups is 1,4-phenylene, PheL is a 1,4-phenylene group which is substituted by 1 to 4 groups L as defined above, Cyc is 1,4-cyclohexylene, Pyd is pyridine-2,5-diyl and Pyr is pyrimidine-2,5-diyl. The following list of preferred groups is comprising the sub formulae A-1 to A-20 as well as their mirror images,

| | |
|---|---|
| -Phe- | A-1 |
| -Pyd- | A-2 |
| -Pyr- | A-3 |
| -PheL- | A-4 |
| -Cyc- | A-5 |
| -Phe-Z-Cyc- | A-6 |
| -Cyc-Z-Cyc- | A-7 |
| -PheL-Cyc- | A-8 |
| -Phe-Z-Phe- | A-9 |
| -Phe-Z-Pyd- | A-10 |
| -Pyd-Z-Phe- | A-11 |
| -Phe-Z-Pyr- | A-12 |
| -Pyr-Z-Phe- | A-13 |
| -PheL-Z-Phe- | A-14 |
| -PheL-Z-Pyd- | A-15 |
| -PheL-Z-Pyr- | A-16 |
| -Pyr-Z-Pyd- | A-17 |
| -Pyd-Z-Pyd- | A-18 |
| -Pyr-Z-Pyr- | A-19 |
| -PheL-Z-PheL- | A-20 |

In these preferred groups Z has the meaning of $Z^{11}$ as given in formula I. Preferably Z is —$CF_2$—O— or —O—$CF_2$— or a single bond.

Very preferably, at least one of the groups
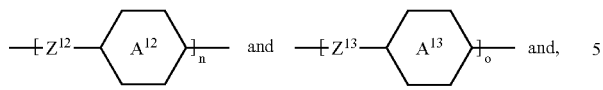 and,
if present,
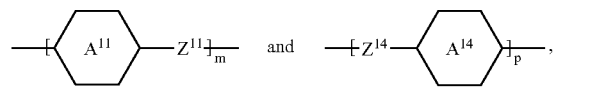,
preferably
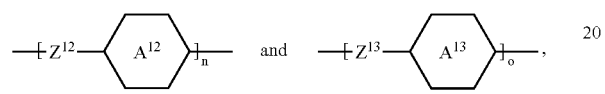,
most preferably all of them, are selected from the following formulae Ia to Ir and their respective mirror images
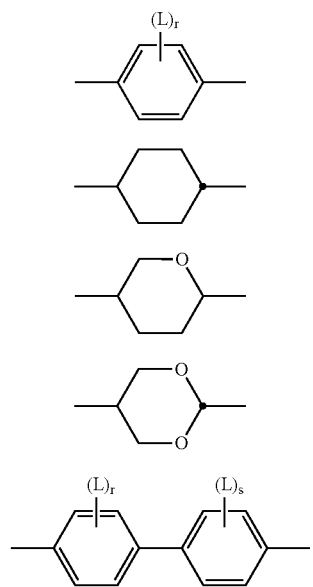
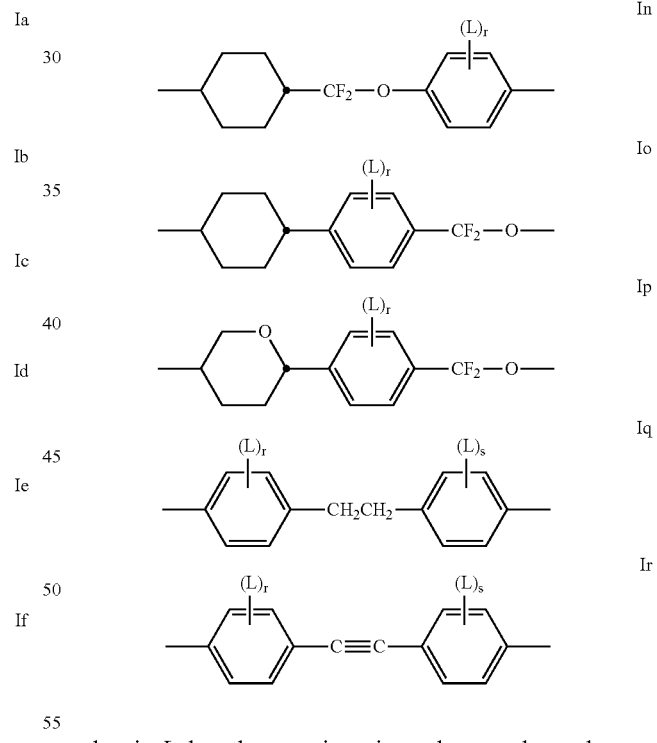
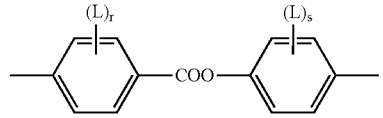 Ii
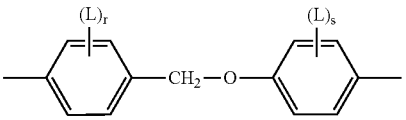 Ij
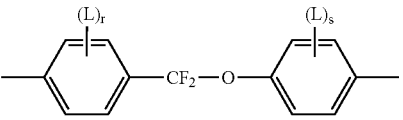 Ik
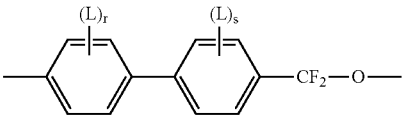 Il
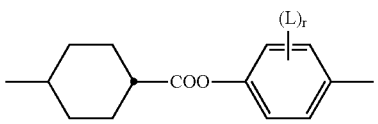 Im
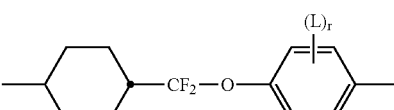 In
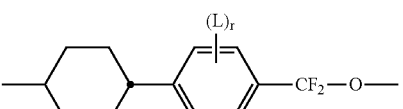 Io
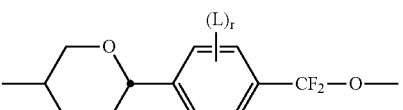 Ip
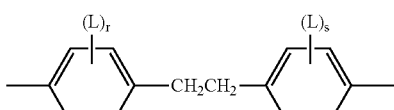 Iq
Ir
wherein L has the meaning given above and r and s are independently of each other, 0, 1, 2, 3 or 4, preferably 0, 1 or 2.
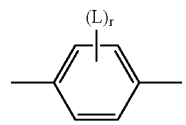

in these preferred formulae is very preferably

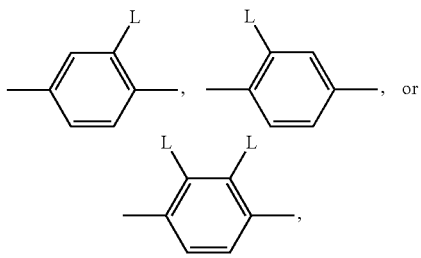

furthermore

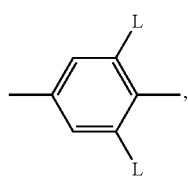

with L having each independently one of the meanings given above.

Especially preferred compounds of formula I comprise at least one group each in rings $A^{11}$ and $A^{12}$ of the formula

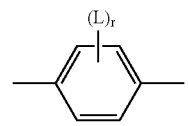

wherein r is 1 or 2.

Further preferred compounds of formula I comprise at least one group each in rings $A^{11}$, $A^{12}$ and $A^{13}$ of the formula

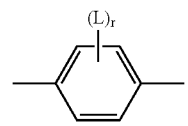

wherein r is 2 and/or at least one group each of the formula

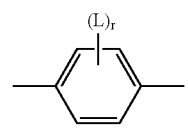

wherein r is 0, 1 or 2.

Very preferably, at least one of the groups

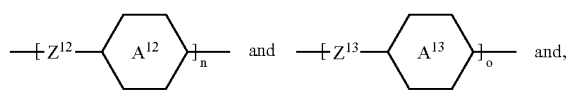

if present,

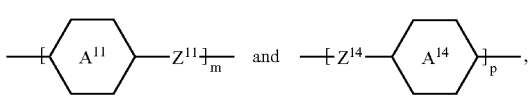

preferably

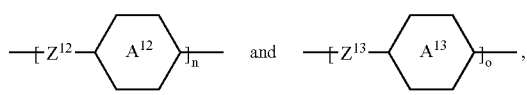

most preferably all of them, are selected from the following formulae and their respective mirror images

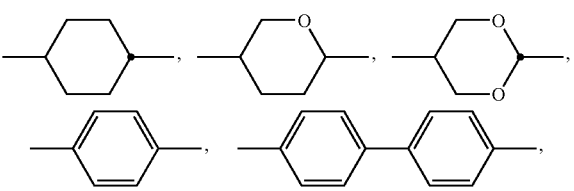

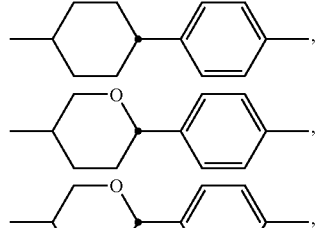

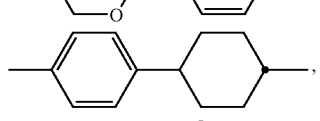

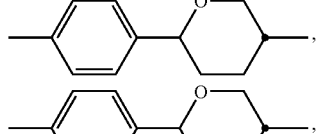

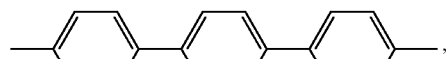

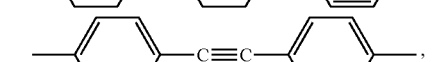

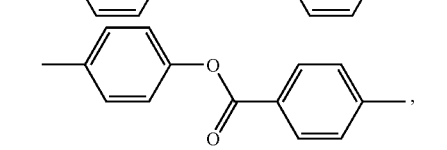

wherein the 1,4-phenylene rings may optionally be substituted by R or L, preferably by alkyl, preferably by methyl, and/or by alkoxy and/or by halogen, preferably F.

More preferably at least one of the groups $-\!\!+\!\!Z^{12}\!-\!\!\bigodot\!\!A^{12}\!\!\bigodot\!\!\Big]_n\!\!-$ and $-\!\!+\!\!Z^{13}\!-\!\!\bigodot\!\!A^{13}\!\!\bigodot\!\!\Big]_o\!\!-$ and, if present, $-\!\!+\!\!\bigodot\!\!A^{11}\!\!\bigodot\!\!-\!Z^{11}\!\!\Big]_m\!\!-$ and $-\!\!+\!\!Z^{14}\!-\!\!\bigodot\!\!A^{14}\!\!\bigodot\!\!\Big]_p\!\!-$, preferably $-\!\!+\!\!Z^{12}\!-\!\!\bigodot\!\!A^{12}\!\!\bigodot\!\!\Big]_n\!\!-$ and $-\!\!+\!\!Z^{13}\!-\!\!\bigodot\!\!A^{13}\!\!\bigodot\!\!\Big]_o\!\!-$, most preferably all of them, are selected from the following formulae and their respective mirror images -continued

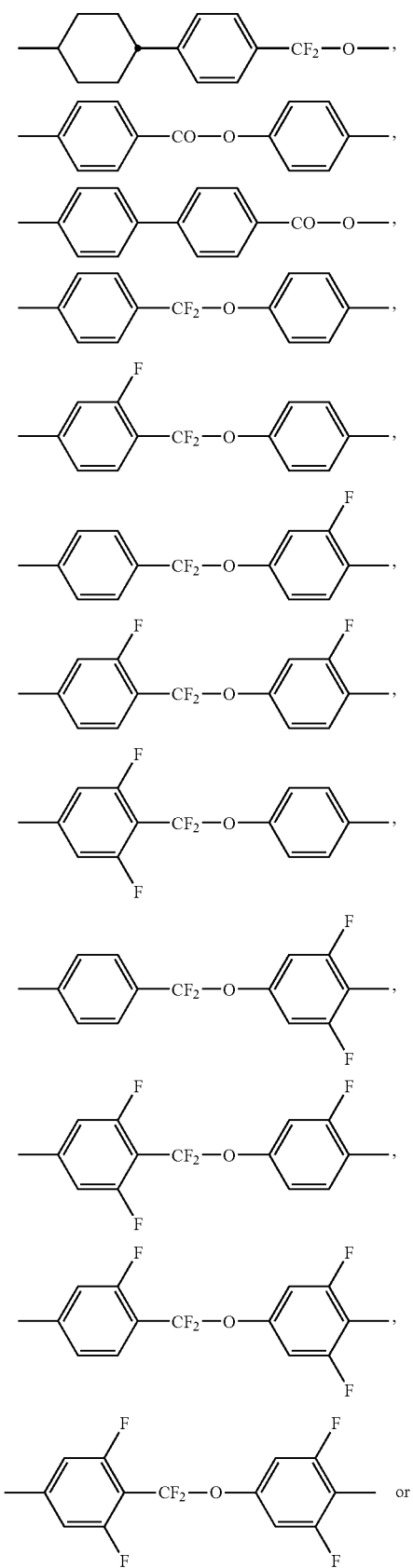

-continued

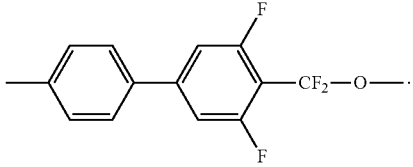

An alkyl or an alkoxy radical, i.e. an alkyl where the terminal $CH_2$ group is replaced by —O—, in this application may be straight-chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, ethoxy, propoxy, butoxy, pentoxy, hexoxy, heptoxy, or octoxy, furthermore nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. an alkyl group in which one non-terminal $CH_2$ group is replaced by —O—, is preferably straight-chain 2-oxapropyl(=methoxymethyl), 2-(=ethoxymethyl) or 3-oxabutyl(=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkenyl group, i.e. an alkyl group wherein one or more $CH_2$ groups are replaced by —CH=CH—, may be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group, wherein one $CH_2$ group is replaced by —O— and one by —CO—, these radicals are preferably neighboured. Accordingly these radicals together form a carbonyloxy group —CO—O— or an oxycarbonyl group —O—CO—. Preferably such an alkyl group is straight-chain and has 2 to 6 C atoms.

It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO—, it can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7- bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

A alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen, it is preferably straight-chain. Halogen is preferably F or Cl, in case of multiple substitution preferably F. The resulting groups include also perfluorinated groups. In case of monosubstitution the F or Cl substituent can be in any desired position, but is preferably in co-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

Halogen means F, Cl, Br and I and is preferably F or Cl, most preferably F.

Each of $R^{11}$, $R^{12}$, $R^{13}$, R, R' and R'' may be a polar or a non-polar group. In case of a polar group, it is preferably selected from CN, $SF_5$, halogen, $OCH_3$, SCN, $COR^5$, $COOR^5$ or a mono- oligo- or polyfluorinated alkyl or alkoxy group with 1 to 4 C atoms. $R^5$ is optionally fluorinated alkyl with 1 to 4, preferably 1 to 3 C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15 C atoms or alkoxy with 2 to 15 C atoms.

Each of $R^{11}$, $R^{12}$, $R^{13}$, $R^{14}$, R, and R' may be an achiral or a chiral group. In case of a chiral group it is preferably of formula I*:

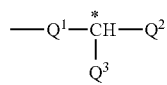

wherein
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another,
$Q^3$ is F, Cl, Br, CN or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl(=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched alkyl group may occasionally be of importance, for example, due to a reduction in the tendency towards crystallization. Branched groups of this type generally do not contain more than one chain branch. Preferred achiral branched groups are isopropyl, isobutyl(=methylpropyl), isopentyl(=3-methylbutyl), isopropoxy, 2-methyl-propoxy and 3-methylbutoxy.

In a preferred embodiment of the present invention one or more of $R^{11}$, $R^{12}$, $R^{13}$, $R^{14}$, R, and R' are —SG-PG.

Particularly preferred are compounds of formula I and its sub-formulae wherein $R^{11}$ is —SG-PG and additionally preferred m is 0 at the same time.

The polymerisable or reactive group PG is preferably selected from $CH_2=CW^1—COO—$,

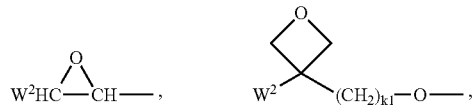

$CH_2=CW^2—(O)_{k1}—$, $CH_3—CH=CH—O—$, $(CH_2=CH)_2$ CH—OCO—, $(CH_2=CH—CH_2)_2CH—OCO—$, $(CH_2=CH)_2CH—O—$, $(CH_2=CH—CH_2)_2N—$, HO—$CW^2W^3—$, HS—$CW^2W^3—$, $HW^2N—$, HO—$CW^2W^3$ NH—, $CH_2=CW^1—CO—NH—$, $CH_2=CH—(COO)_{k1}$-Phe-$(O)_{k2}—$, Phe-CH=CH—, HOOC—, OCN—, and $W^4W^5W^6Si—$, with $W^1$ being H, Cl, CN, phenyl or alkyl with 1 to 5 C-atoms, in particular H, $C_1$ or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

Especially preferably PG is a vinyl group, an acrylate group, a methacrylate group, an oxetane group or an epoxy group, especially preferably an acrylate or methacrylate group.

As for the spacer group SG all groups can be used that are known for this purpose to those skilled in the art. The spacer group SG is preferably of formula SG'-X, such that PG-SG- is PG-SG'-X—, wherein
SG' is alkylene with up to 20 C atoms which may be unsubstituted, mono- or poly-substituted by F, Cl, Br, I or CN, it being also possible for one or more non-adjacent $CH_2$ groups to be replaced, in each case independently from one another, by —O—, —S—, —NH—, —$NR^{01}$—, —SiR$^{01}$R$^{02}$—, —CO—, —COO—, —OCO—, —OCO—O—, —S—, —CO—, —CO—S—, —CH=CH— or —C≡C— in such a manner that O and/or S atoms are not linked directly to one another, X is —O—, —S—, —CO—, —COO—, —OCO—, —O—COO—, —CO—NR$^{01}$—, —NR$^{01}$—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—, —CH=CH— or a single bond, and R$^{01}$, R$^{02}$, Y$^{01}$ and Y$^{02}$ have one of the respective meanings given above.

X is preferably —O—, —S—, —OCH$_2$—, —CH$_2$O—, —SCH$_2$—, —CH$_2$S—, —CF$_2$O—, —OCF$_2$—, —CF$_2$S—, —SCF$_2$— —CH$_2$CH$_2$—, —CF$_2$CH$_2$—, —CH$_2$CF$_2$—, —CF$_2$CF$_2$—, —CH=N—, —N=CH—, —N=N—, —CH=CR$^0$—, CY$^{02}$CY$^{02}$—, —C≡C— or a single bond, in particular —O—, —S—, —C≡C—, —CY$^{01}$=CY$^{02}$— or a single bond, very preferably a group that is able to from a conjugated system, such as —C≡C— or —CY$^{01}$=CY$^{02}$—, or a single bond.

Typical groups SG' are, for example, —(CH$_2$)$_p$—, —(CH$_2$CH$_2$O)$_q$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_p$—, with p being an integer from 2 to 12, q being an integer from 1 to 3 and R$^0$, R$^{00}$ and the other parameters having the meanings given above.

Preferred groups SG' are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

In another preferred embodiment SG' is a chiral group of formula I*':

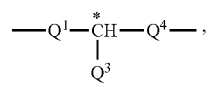

wherein
Q$^1$ and Q$^3$ have the meanings given in formula I*, and
Q$^4$ is an alkylene or alkylene-oxy group with 1 to 10 C atoms or a single bond, being different from Q$^1$,
with Q$^1$ being linked to the polymerisable group PG.

Further preferred are compounds with one or two groups PG-SG- wherein SG is a single bond.

In case of compounds with two groups PG-SG, each of the two polymerisable groups PG and the two spacer groups SG can be identical or different.

Preferably the liquid crystalline media according to the instant invention contain a component A comprising, preferably predominantly consisting of and most preferably entirely consisting of compounds of formula I.

The compounds of formula I are accessible by the usual methods known to the expert. Convenient starting materials for the compounds of formula I are, amongst others, the following compounds, which either are commercially available or easily accessible by published methods are e.g.:

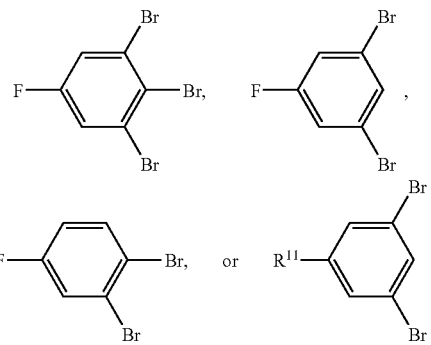

wherein, like in the reaction schemes given below, the parameters have the respective meanings given above and preferably R$^{11}$ is H or alkyl, preferably CH$_3$.

Compounds of formula I are beneficially prepared e.g. according to one of the following two reaction schemes (schemes I and II) and analogous synthetic routes starting from the building blocks mentioned above or from similar ones.

Scheme I

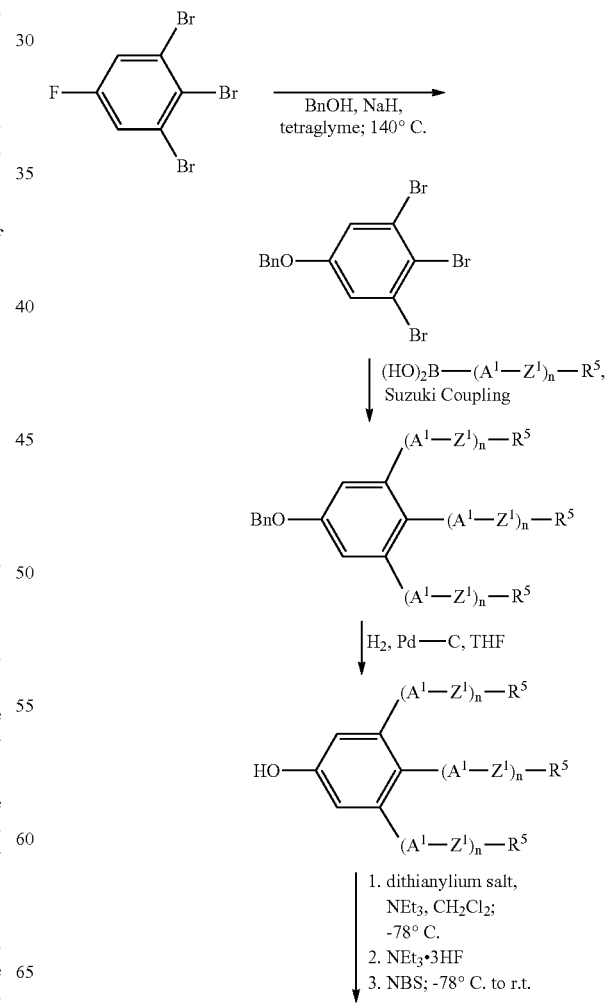

-continued

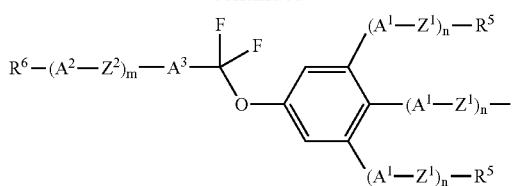

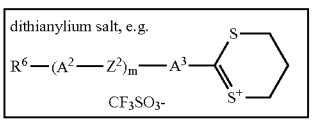

Scheme II

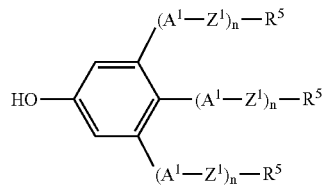

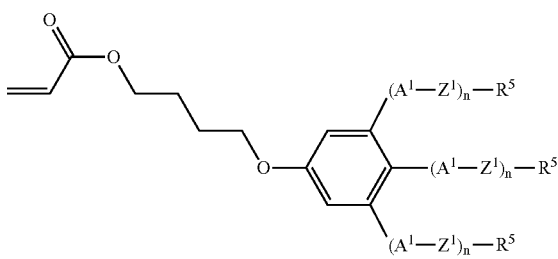

While in schemes I and II the parameters have the respective meanings given above and preferably $R^5$ and $R^6$ are, in each occurrence independently of each other, H, F, Cl, CN, $SF_5$ or alkyl or alkoxy, wherein one or more H atoms may be replaced by halogen, preferably by F, $Z^1$ and $Z^2$ are, in each occurrence independently of each other, a single bond, —$CF_2O$—, —$OCF_2$—, —$CH_2CH_2$—, or —$F_2CF_2$—, $A^1$ adjacent to the borob atom in the boronic acid are, in each occurrence independently of each other, an aromatic ring, preferably

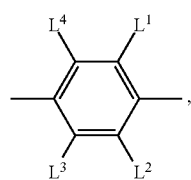

and the other $A^1$, and $A^2$ are, in each occurrence independently of each other,

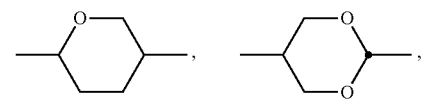

 or 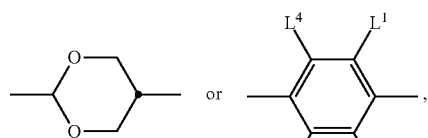, $L^1$ to $L^4$ are, independently of each other, H or F, and m and n are, in each occurrence independently of each other, 0, 1, 2 or 3, preferably 1, 2, or 3.

DIAD is diisoproppylazodicarboxylate,

NBS is N-bromsuccinimide, $NEt_3$ is triethylamine $NEt_3.3HF$ is the HF adduct of triethylamine, Ph is phenyl and THF is tetrahydrofurane.

Comprising in this application means in the context of compositions that the entity referred to, e.g. the medium or the component, contains the compound or compounds in question, preferably in a total concentration of 10% or more and most preferably of 20% or more.

Predominantly consisting, in this context, means that the entity referred to contains 80% or more, preferably 90% or more and most preferably 95% or more of the compound or compounds in question.

Entirely consisting, in this context, means that the entity referred to contains 98% or more, preferably 99% or more and most preferably 100.0% of the compound or compounds in question.

The concentration of the compounds according to the present application are contained in the media according to the present application preferably is in the range from 0.5% or more to 30% or less, more preferably in the range from 1% or more to 20% or less and most preferably in the range from 5% or more to 12% or less.

In a preferred embodiment the mesogenic modulation media according to the instant invention comprise a component A, preferably in a concentration of 1% to 25% by weight, comprising, preferably predominantly consisting of and most preferably entirely consisting of, one compound or more compounds of the formula I given above and optionally a dielectrically positive component B comprising, preferably predominantly consisting of and most preferably entirely consisting of one compound or of more compounds of formula II

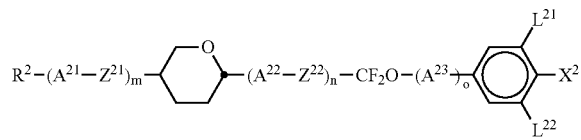

II wherein
$R^2$ has the meaning given under formula I for $R^{11}$,
$A^{21}$, $A^{22}$ and $A^{23}$ are, each independently of each other,

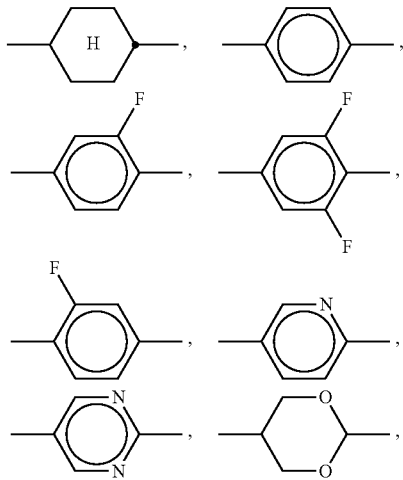

whereby each of $A^{21}$ and $A^{22}$ may have the same or a different meaning if present twice,
$Z^{21}$ and $Z^{22}$ are, each independently of each other, a single bond, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —CH$_2$O—, —OCH$_2$—, —CF$_2$O—, —OCF$_2$—, —CO—O— or —O—CO—, whereby each of $Z^{21}$ and $Z^{22}$ may have the same or a different meaning if present twice,
$X^2$ is halogen, —CN, —NCS, —SF$_5$, —SO$_2$CF$_3$, alkyl, alkenyl, alkenyloxy or alkylalkoxy or alkoxy radical each mono- or polysubstituted by CN and/or halogen,
$L^{21}$ and $L^{22}$ are, each independently of each other, H or F, and
m is 0, 1 or 2,
n is 0, 1, 2 or 3,
o is 0, 1 or 2, preferably 0 or 1 and
m+n+o is 3 or less, preferably 2 or less,
optionally a component C, preferably in a concentration of 1% to 25% by weight, comprising, preferably predominantly consisting of and most preferably entirely consisting of one compound or of more compounds of formula III

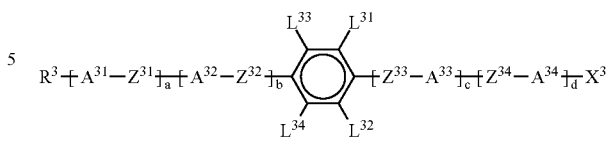

III wherein
a, b, c and d are each independently of each other 0, 1 or 2, whereby
a+b+c+d is 4 or less,
$A^{31}$, $A^{32}$, $A^{33}$ and $A^{34}$ are, each independently of each other,

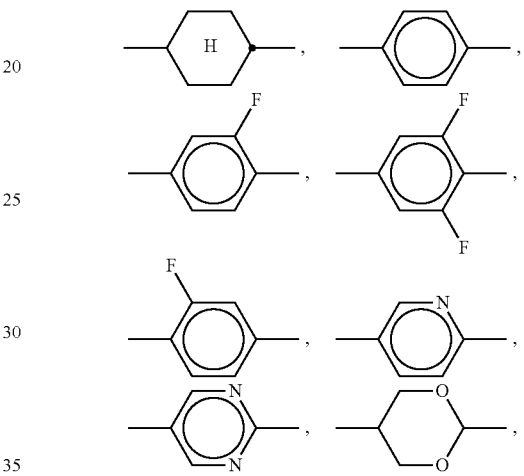

whereby each of $A^{31}$, $A^{32}$, $A^{33}$ and $A^{34}$ may have the same or a different meaning if present twice,
$Z^{31}$, $Z^{32}$, $Z^{33}$ and $Z^{34}$ are, each independently of each other, a single bond, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡D-, —CH$_2$O—, —OCH$_2$—, —CF$_2$O—, —OCF$_2$—, —CO—O— or —O—CO—, whereby each of $Z^{31}$, $Z^{32}$, $Z^{33}$ and $Z^{34}$ may have the same or a different meaning if present twice,
$R^3$ is an alkyl or alkoxy radical having from 1 to 15 carbon atoms, wherein one or more methylene groups of said alkyl or alkoxy radical may be replaced independently of each other by —O—, —S—, —SiR$^x$R$^y$—, —CH=CH—, —C_D-, —CO—O— and/or —O—CO— such that oxygen and/or sulfur atoms are not linked directly to each other, said alkyl or alkoxy radical being unsubstituted or mono-substituted with a —CN group or mono- or poly-substituted with halogen, preferably $R^{11}$ is a straight-chain alkyl, alkoxy, alkenyl, alkenyloxy or —O-alkylene-O-alkyl radical with up to 10 carbon atoms, said radicals being unsubstituted or mono- or poly-substituted with halogen,
$L^{31}$, $L^{32}$, $L^{33}$ and $L^{34}$ are each independently of each other hydrogen, halogen, a CN group, an alkyl or alkoxy radical having from 1 to 15 carbon atoms wherein one or more methylene groups of said alkyl or alkoxy radical may be replaced independently of each other by —O—, —S—, —SiR$^x$R$^y$—, —CH=CH—, —C_D-, —CO—O— and/or —O—CO—
such that oxygen and/or sulfur atoms are not linked directly
to each other, said alkyl or alkoxy radical being unsubstituted or mono-substituted with a —CN group or mono- or poly-substituted with halogen, with the proviso that at least one of $L^{31}$, $L^{32}$, $L^{33}$ and $L^{34}$ is not hydrogen, $X^3$ is F, Cl, $CF_3$, $OCF_3$, CN, NCS, —$SF_5$ or —$SO_2$—$R^z$, $R^x$ and $R^y$ are independently of each other hydrogen or an alkyl radical having from 1 to 7 carbon atoms; preferably $R^x$ and $R^y$ are both methyl, ethyl, propyl or butyl, and $R^z$ is an alkyl radical having from 1 to 7 carbon atoms, said alkyl radical being unsubstituted or mono- or poly-substituted with halogen; preferably $R^z$ is $CF_3$, $C_2F_5$ or n-$C_4F_9$ and 1-20% by weight of component D comprising one chiral compound or more chiral compounds with a HTP of $\geq 20$ μm.

The inventive mixtures contain 1-25 wt. %, preferably 2-20 wt. % and most preferably 3-15 wt. % of component A.

Suitable chiral compounds of component D are those which have an absolute value of the helical twisting power of 20 μm or more, preferably of 40 μm or more and most preferably of 60 μm or more. The HTP is measured in MLC-6260 at a temperature of 20° C.

The chiral component D comprises preferably one or more chiral compounds which have a mesogenic structure und exhibit preferably one or more mesophases themselves, particularly at least one cholesteric phase. Preferred chiral compounds being comprised in the chiral component D are, amongst others, well known chiral dopants like cholesteryl-nonanoate (CN), R/S-811, R/S-1011, R/S-2011, R/S-3011, R/S-4011, R/S-5011, CB-15 (Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated within this application by way of reference. Particular preference is given to chiral binaphthyl derivatives as disclosed in EP 01 111 954.2, chiral binaphthol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195.

The controlling medium of the present invention has a characteristic temperature, preferably a clearing point, in the range from about −30° C. to about 80° C., especially up to about 55° C.

The inventive mixtures contain one or more (two, three, four or more) chiral compounds in the range of 1-25 wt. %, preferably 2-20 wt. %. Especially preferred are mixtures containing 3-15 wt. % of a chiral compound.

Preferred embodiments are indicated below:

The medium comprises one, two or more compounds of formula I;

Component B preferably contains besides one compound ore more compounds of formula II one ester compound or more ester compounds of the formula Z

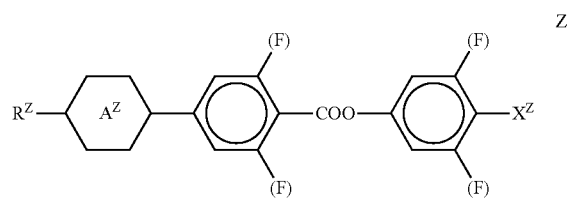

wherein $R^z$ has the meaning given under formula I for $R^{11}$,

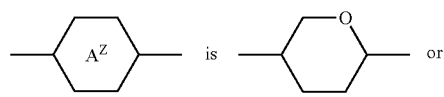

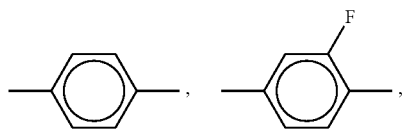

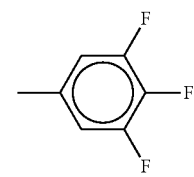

$X^Z$ is F, Cl, CN, NCS, $OCF_3$, $CF_3$ or $SF_5$.

wherein $R^Z$ has the meaning given under formula II for $R^2$.

Especially preferred are mixtures containing 5% to 35%, preferably 10% to 30% and especially preferred 10% to 20% of compounds of formula Z.

The component B preferably contains additionally one or more compounds of formula N

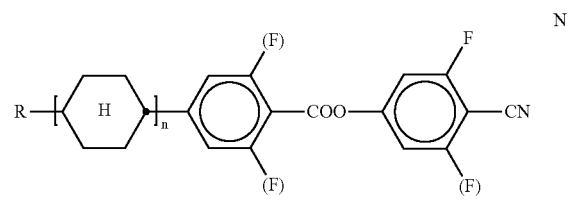

wherein

R has the meaning given under formula I for $R^{11}$ and preferably is alkyl or Alkyl-C≡C, "Alkyl" is alkyl with 1 to 7 C-atoms, preferably n-alkyl, and n is 0 or 1.

The component B preferably additionally comprises one or more compounds selected from the group of ester compounds of formula E

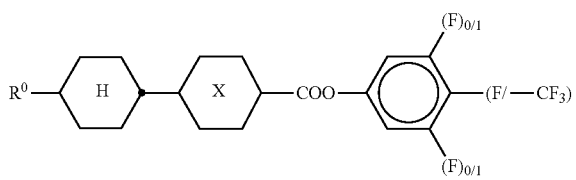

in which $R^0$ has the meaning given for $R^{11}$ under formula I and preferably is alkyl and

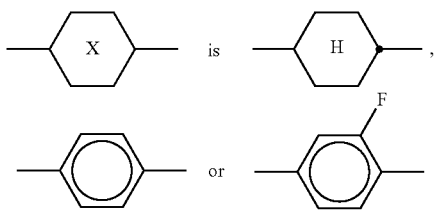

The proportion of the compounds of formula E is preferably 10-30% by weight, in particular 15% to 25%.

The medium preferably comprises one compound or more compounds selected from the group of formulae Q-1 and Q-2

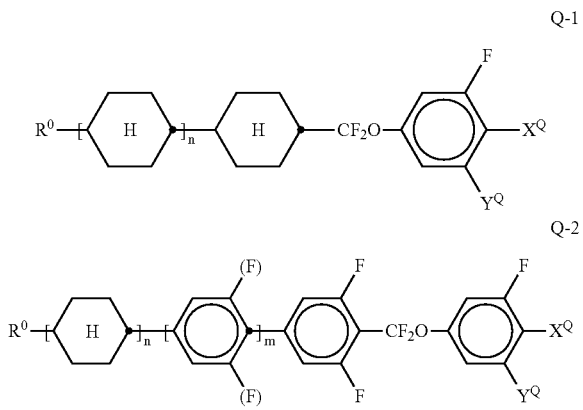

wherein $R^0$ has the meaning given for $R^{11}$ under formula I and n and m are, independently of each other 0 or 1.

The medium preferably comprises one compound or more compounds selected from the group of compounds of formula II in which $R^0$ is methyl.

The medium preferably comprises one dioxane compound, two or more dioxane compounds, preferably one dioxane compound or two dioxane compounds, selected from the group of formulae Dx-1 and Dx-2

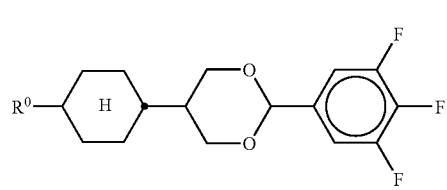

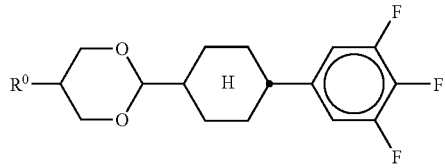

wherein $R^0$ has the meaning given for $R^{11}$ under formula I.

It has been found that even a relatively small proportion of compounds of the formula I mixed with conventional liquid-crystal materials, but in particular with one or more compounds of the formulae II and III, results in a lower operating voltage and a broader operating temperature range. Preference is given, in particular, to mixtures which, besides one or more compounds of the formula I, comprise one or more compounds of the formula II, in particular compounds of the formula II in which $X^2$ is F, Cl, CN, NCS, $CF_3$ or $OCF_3$. The compounds of the formulae I to III are colourless, stable and readily miscible with one another and with other liquid-crystalline materials.

The optimum mixing ratio of the compounds of the formulae I and II and III depends substantially on the desired properties, on the choice of the components of the formulae I, II and/or III, and on the choice of any other components that may be present. Suitable mixing ratios within the range given above can easily be determined from case to case.

The total amount of compounds of the formulae I to III in the mixtures according to the invention is not crucial. The mixtures can therefore comprise one or more further components for the purposes of optimisation of various properties. However, the observed effect on the operating voltage and the operating temperature range is generally greater, the higher the total concentration of compounds of the formulae I to III.

In a particularly preferred embodiment, the media according to the invention comprise compounds of the formula III which $X^3$ is F, $OCF_3$, $OCHF_2$, $OCH=CF_2$, $OCF=CF_2$ or $OCF_2-CF_2H$. A favourable synergistic effect with the compounds of the formula I results in particularly advantageous properties. In particular, mixtures comprising compounds of formula I and of formula II and of formula III are distinguished by their low operating voltages.

The individual compounds of the formulae II to III which can be used in the media according to the invention are either known or can be prepared analogously to the known compounds.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM, however, particularly preferred are displays, which have electrodes on just one of the substrates, i.e. so called interdigital electrodes, as those used in IPS displays, preferably in one of the established structures.

A significant difference between the displays according to the invention and the conventional displays based on the twisted nematic cell consists, however, in the choice of the liquid-crystal parameters of the liquid-crystal layer.

The media according to the invention are prepared in a manner conventional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker and R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity and/or the alignment of the nematic phases. Furthermore, stabilisers and antioxidants can be added.

The mixtures according to the invention are suitable for TN, STN, ECB and IPS applications and isotropic switching mode (ISM) applications. Hence, there use in an electro-optical device and an electro-optical device containing liquid crystal media comprising at least one compound according to the invention are subject matters of the present invention.

The inventive mixtures are highly suitable for devices which operate in an optically isotropic state. The mixtures of the invention are surprisingly found to be highly suitable for the respective use.

Electro-optical devices that are operated or operable in an optically isotropic state recently have become of interest with respect to video, TV, and multi-media applications. This is because conventional liquid crystal displays utilizing electro-optical effects based on the physical properties of liquid crystals exhibit a rather high switching time which is undesired for said applications. Furthermore most of the conventional displays show a significant viewing angle dependence of contrast that in turn makes necessary measures to compensate this undesired property.

With regard to devices utilizing electro-optical effects in an isotropic state the German Patent Application DE 102 17 273 A1 for example discloses light controlling (light modulation) elements in which the mesogenic controlling medium for modulation is in the isotropic phase at the operating temperature. These light controlling elements have a very short switching time and a good viewing angle dependence of contrast. However, the driving or operating voltages of said elements are very often unsuitably high for some applications.

German Patent Application DE 102 41 301 yet unpublished describes specific structures of electrodes allowing a significant reduction of the driving voltages. However, these electrodes make the process of manufacturing the light controlling elements more complicated.

Furthermore, the light controlling elements, for example, disclosed in both DE 102 17 273 A1 and DE 102 41 301 show a significant temperature dependence. The electro-optical effect that can be induced by the electrical field in the controlling medium being in an optical isotropic state is most pronounced at temperatures close to the clearing point of the controlling medium. In this range the light controlling elements have the lowest values of their characteristic voltages and, thus, require the lowest operating voltages. As temperature increases the characteristic voltages and hence the operating voltages increase remarkably. Typical values of the temperature dependence are in the range from about a few volts per centigrade up to about ten or more volts per centigrade. While DE 102 41 301 describes various structures of electrodes for devices operable or operated in the isotropic state, DE 102 17 273 A1 discloses isotropic media of varying composition that are useful in light controlling elements operable or operated in the isotropic state. The relative temperature dependence of the threshold voltage in these light controlling elements is at a temperature of 1 centigrade above the clearing point in the range of about 50%/centigrade. That temperature dependence decreases with increasing temperature so that it is at a temperature of 5 centigrade above the clearing point of about 10%/centigrade. However, for many practical applications of displays utilizing said light controlling elements the temperature dependence of the electro-optical effect is too high. To the contrary, for practical uses it is desired that the operating voltages are independent from the operating temperature over a temperature range of at least some centigrades, preferably of about 5 centigrades or more, even more preferably of about 10 centigrades or more and especially of about 20 centigrades or more.

Now it has been found that the use of the inventive mixtures are highly suitable as controlling media in the light controlling elements as described above and in DE 102 17 273 A1, DE 102 41 301 and DE 102 536 06 and broaden the temperature range in which the operating voltages of said electro-optical operates. In this case the optical isotropic state or the blue phase is almost completely or completely independent from the operating temperature.

This effect is even more distinct if the mesogenic controlling media exhibit at least one so-called "blue phase" as described in yet unpublished WO 2004/046 805. Liquid crystals having an extremely high chiral twist may have one or more optically isotropic phases. If they have a respective cholesteric pitch, these phases might appear bluish in a cell having a sufficiently large cell gap. Those phases are therefore also called "blue phases" (Gray and Goodby, "Smectic Liquid Crystals, Textures and Structures", Leonhard Hill, USA, Canada (1984)). Effects of electrical fields on liquid crystals existing in a blue phase are described for instance in H. S. Kitzerow, "The Effect of Electric Fields on Blue Phases", Mol. Cryst. Liq. Cryst. (1991), Vol. 202, p. 51-83, as well as the three types of blue phases identified so far, namely BP I, BP II, and BP III, that may be observed in field-free liquid crystals. It is noteworthy, that if the liquid crystal exhibiting a blue phase or blue phases is subjected to an electrical field, further blue phases or other phases different from the blue phases 1, II and III might appear.

The inventive mixtures can be used in an electro-optical light controlling element which comprises
  one or more, especially two substrates;
  an assembly of electrodes;
  one or more elements for polarizing the light; and
  said controlling medium;
whereby said light controlling element is operated (or operable) at a temperature at which the controlling medium is in an optically isotropic phase when it is in a non-driven state.

The controlling medium of the present invention has a characteristic temperature, preferably a clearing point, in the range from about −30° C. to about 80° C., especially up to about 55° C.

The operating temperature of the light controlling elements is preferably above the characteristic temperature of the controlling medium said temperature being usually the transition temperature of the controlling medium to the blue phase; generally the operating temperature is in the range of about 0.1° to about 50°, preferably in the range of about 0.1° to about 10° above said characteristic temperature. It is highly preferred that the operating temperature is in the range from the transition temperature of the controlling medium to the blue phase up to the transition temperature of the controlling medium to the isotropic phase which is the clearing point. The light controlling elements, however, may also be operated at temperatures at which the controlling medium is in the isotropic phase. (For the purposes of the present invention the term "characteristic temperature" is defined as follows:

If the characteristic voltage as a function of temperature has a minimum, the temperature at this minimum is denoted as characteristic temperature.

If the characteristic voltage as a function of temperature has no minimum and if the controlling medium has one or more blue phases, the transition temperature to the blue phase is denoted as characteristic temperature; in case there are more than one blue phase, the lowest transition temperature to a blue phase is denoted as characteristic temperature.

If the characteristic voltage as a function of temperature has no minimum and if the controlling medium has no blue phase, the transition temperature to the isotropic phase is denoted as characteristic temperature.)

In the context of the present invention the term "alkyl" means, as long as it is not defined in a different manner elsewhere in this description or in the claims, straight-chain and branched hydrocarbon (aliphatic) radicals with 1 to 15 carbon atoms. The hydrocarbon radicals may be unsubstituted or substituted with one or more substituents being independently selected from the group consisting of F, Cl, Br, I or CN.

The dielectrics may also comprise further additives known to the person skilled in the art and described in the literature. For example, 0 to 5% of pleochroic dyes, antioxidants or stabilizers can be added.

C denotes a crystalline phase, S a smectic phase, $S_C$ a smectic C phase, N a nematic phase, I the isotropic phase and BP the blue phase.

$V_X$ denotes the voltage for X % transmission. Thus e.g. $V_{10}$ denotes the voltage for 10% transmission and $V_{100}$ denotes the voltage for 100% transmission (viewing angle perpendicular to the plate surface). $t_{on}$ (respectively $\tau_{on}$) denotes the switch-on time and $t_{off}$ (respectively $\tau_{off}$) the switch-off time at an operating voltage corresponding the value of $V_{100}$, respectively of $V_{max}$.

$\Delta n$ denotes the optical anisotropy. $\Delta\varepsilon$ denotes the dielectric anisotropy ($\Delta\varepsilon = \varepsilon_\| - \varepsilon_\perp$, where $\varepsilon_\|$ denotes the dielectric constant parallel to the longitudinal molecular axes and $\varepsilon_\|$ denotes the dielectric constant perpendicular thereto). The electro-optical data are measured in a TN cell at the 1$^{st}$ minimum of transmission (i.e. at a (d·$\Delta n$) value of 0.5 μm) at 20° C., unless expressly stated otherwise. The optical data are measured at 20° C., unless expressly stated otherwise.

Optionally, the light modulation media according to the present invention can comprise further liquid crystal compounds in order to adjust the physical properties. Such compounds are known to the expert. Their concentration in the media according to the instant invention is preferably 0% to 30%, more preferably 0% to 20% and most preferably 5% to 15%.

Preferably inventive media have a range of the blue phase or, in case of the occurrence of more than one blue phase, a combined range of the blue phases, with a width of 9° or more, preferably of 10° or more, more preferably of 15° or more and most preferably of 20° or more.

In a preferred embodiment this phase range at least from 10° C. to 30° C., most preferably at least from 10° C. to 40° C. and most preferably at least from 0° C. to 50° C., wherein at least means, that preferably the phase extends to temperatures below the lower limit and at the same time, that it extends to temperatures above the upper limit.

In another preferred embodiment this phase range at least from 20° C. to 40° C., most preferably at least from 30° C. to 80° C. and most preferably at least from 30° C. to 90° C. This embodiment is particularly suited for displays with a strong back light, dissipating energy and thus heating the display.

In the present application the term dielectrically positive compounds describes compounds with $\Delta\varepsilon > 1.5$, dielectrically neutral compounds are compounds with $-1.5 \leq \Delta\varepsilon \leq 1.5$ and dielectrically negative compounds are compounds with $\Delta\varepsilon < -1.5$. The same holds for components. $\Delta\varepsilon$ is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties have been determined with test cells prepared at Merck KGaA, Germany. The test cells for the determination of $\Delta\varepsilon$ had a cell gap of 22 μm. The electrode was a circular ITO electrode with an area of 1.13 cm$^2$ and a guard ring. The orientation layers were lecithin for homeotropic orientation ($\varepsilon_\|$) and polyimide AL-1054 from Japan Synthetic Rubber for homogenous orientation ($\varepsilon_\perp$). The capacities were determined with a frequency response analyser Solatron 1260 using a sine wave with a voltage of 0.3 or 0.1 $V_{rms}$. The light used in the electro-optical measurements was white light. The set up used was a commercially available equipment of Otsuka, Japan. The characteristic voltages have been determined under perpendicular observation. The threshold voltage ($V_{10}$), mid-grey voltage ($V_{50}$) and saturation voltage ($V_{90}$) have been determined for 10%, 50% and 90% relative contrast, respectively.

The mesogenic modulation material has been filled into an electro optical test cell prepared at the respective facility of Merck KGaA. The test cells had inter-digital electrodes on one substrate side. The electrode width was 10 μm, the distance between adjacent electrodes was 10 μm and the cell gap was also 10 μm. This test cell has been evaluated electro-optically between crossed polarisers.

At low temperatures, the filled cells showed the typical texture of a chiral nematic mixture, with an optical transmission between crossed polarisers without applied voltage. Upon heating, at a first temperature ($T_1$) the mixtures turned optically isotropic, being dark between the crossed polarisers. This indicated the transition from the chiral nematic phase to the blue phase at that temperature. Up to a second temperature ($T_2$) the cell showed an electro-optical effect under applied voltage, typically of some tens of volts, a certain voltage in that range leading to a maximum of the optical transmission. Typically at a higher temperature the voltage needed for a visible electro-optical effect increased strongly, indicating the transition from the blue phase to the isotropic phase at this second temperature ($T_2$).

The temperature range ($\Delta T(BP)$), where the mixture can be used electro-optically in the blue phase most beneficially has been identified as ranging from $T_1$ to $T_2$. This temperature range ($\Delta T(BP)$) is the temperature range given in the examples of this application. The electro-optical displays can also be operated at temperatures beyond this range, i.e. at temperatures above $T_2$, albeit only at significantly increased operation voltages.

The liquid crystal media according to the present invention can contain further additives and chiral dopants in usual concentrations. The total concentration of these further constituents is in the range of 0% to 10%, preferably 0.1% to 6%, based in the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-, VAN-AMD and in particular in composite systems, like PDLD-, NCAP- and PN-LCDs and especially in HPDLCs.

The melting point T(C,N), the transition from the smectic (S) to the nematic (N) phase T(S,N) and the clearing point T (N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nN•F•F | $C_nH_{2n+1}$ | CN | F | F |
| nF | $C_nH_{2n+1}$ | F | H | H |
| nF•F | $C_nH_{2n+1}$ | F | H | F |
| nF•F•F | $C_nH_{2n+1}$ | F | F | F |
| nOF | $OC_nH_{2n+1}$ | F | H | H |
| nCl | $C_nH_{2n+1}$ | Cl | H | H |
| nCl•F | $C_nH_{2n+1}$ | Cl | H | F |
| nCl•F•F | $C_nH_{2n+1}$ | Cl | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_3$•F | $C_nH_{2n+1}$ | $OCF_3$ | H | F |
| $nOCF_3$•F•F | $C_nH_{2n+1}$ | $OCF_3$ | F | F |
| $nOCF_2$ | $C_nH_{2n+1}$ | $OCHF_2$ | H | H |
| $nOCF_2$•F | $C_nH_{2n+1}$ | $OCHF_2$ | H | F |
| $nOCF_2$•F•F | $C_nH_{2n+1}$ | $OCHF_2$ | F | F |
| nS | $C_nH_{2n+1}$ | NCS | H | H |
| nS•F | $C_nH_{2n+1}$ | NCS | H | F |
| nS•F•F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nF•Cl | $C_nH_{2n+1}$ | Cl | H | F |

TABLE A

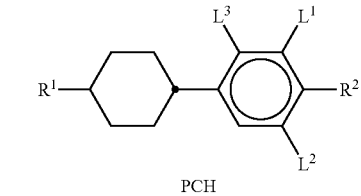

PCH

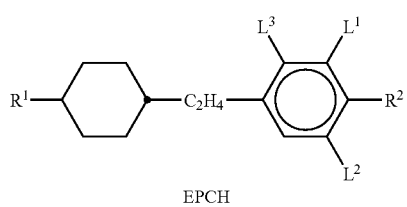

EPCH

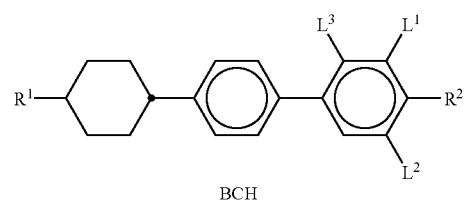

BCH

TABLE A-continued
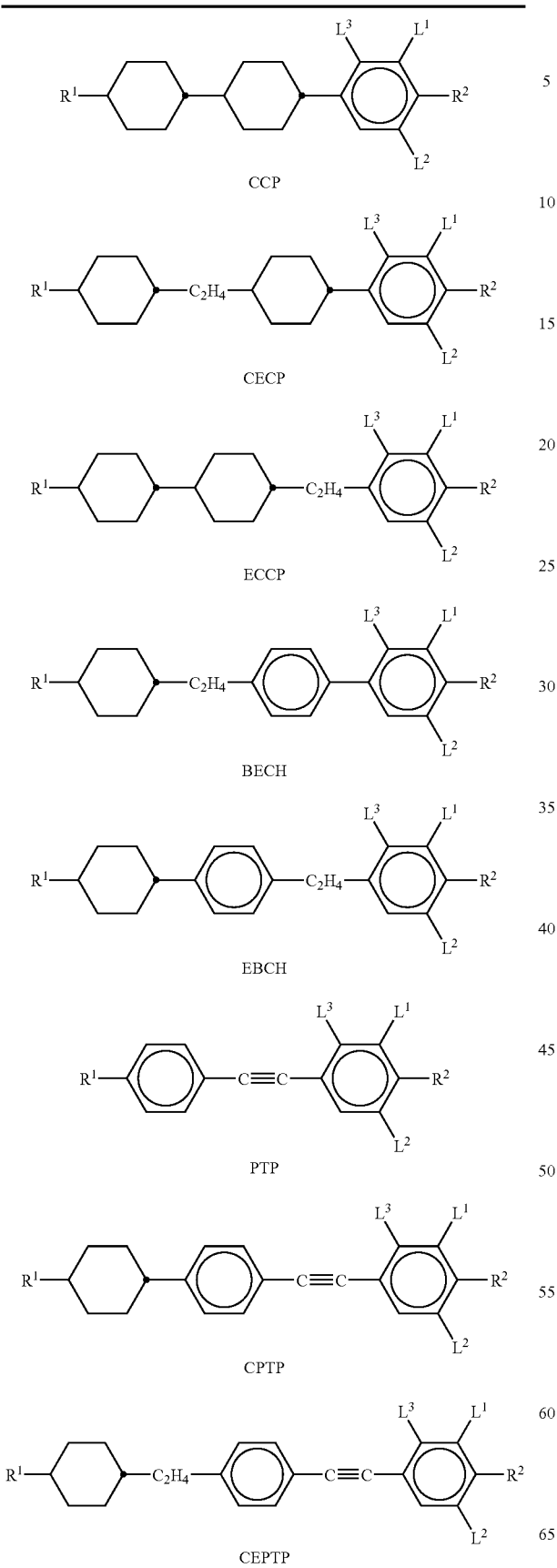
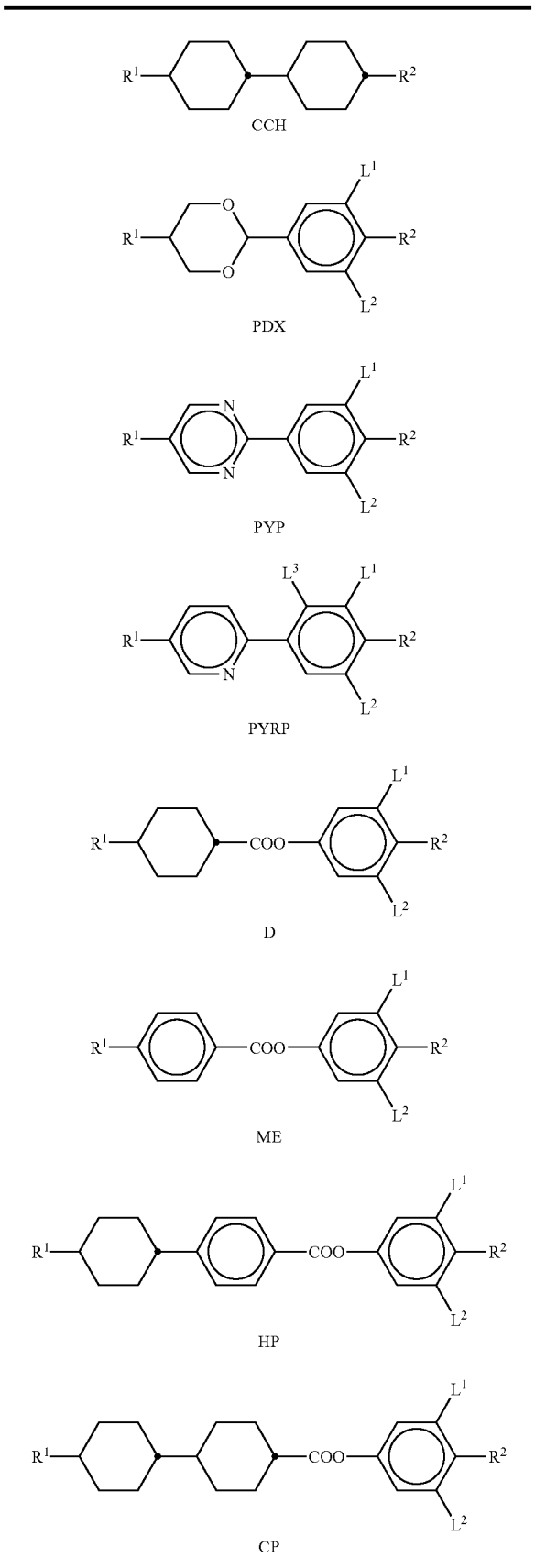

TABLE A-continued
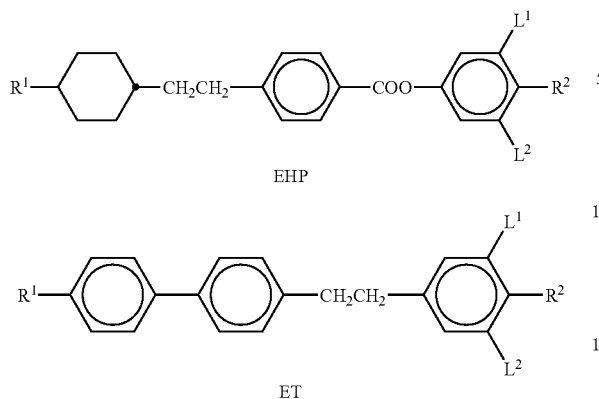
EHP
ET
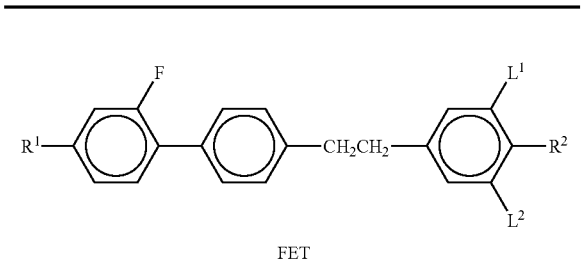
FET
TABLE B
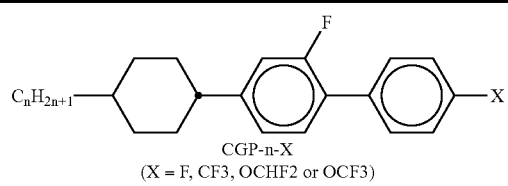
CGP-n-X
(X = F, CF3, OCHF2 or OCF3)
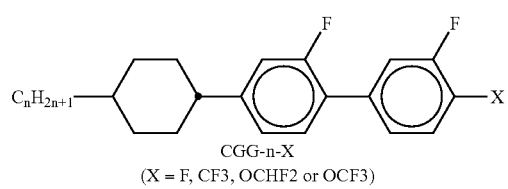
CGG-n-X
(X = F, CF3, OCHF2 or OCF3)
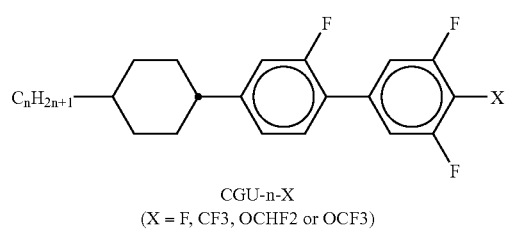
CGU-n-X
(X = F, CF3, OCHF2 or OCF3)
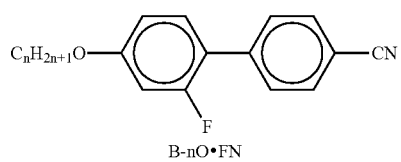
B-nO•FN
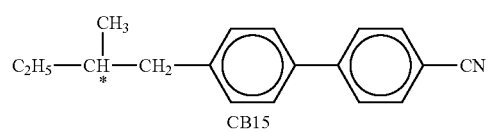
CB15
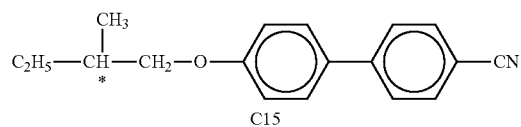
C15
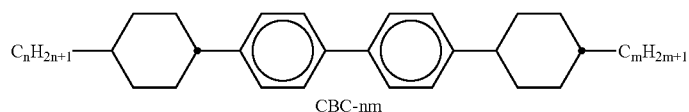
CBC-nm TABLE B-continued
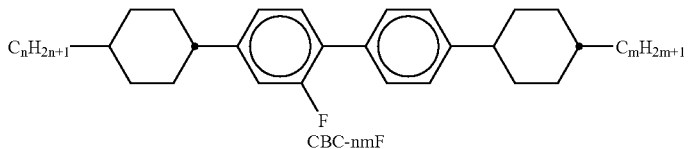
CBC-nmF
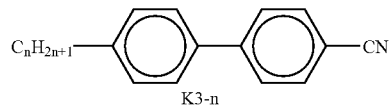
K3-n
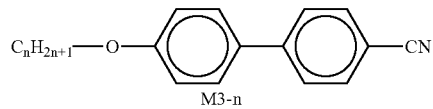
M3-n
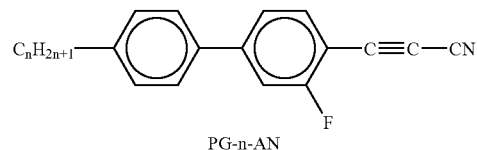
PG-n-AN
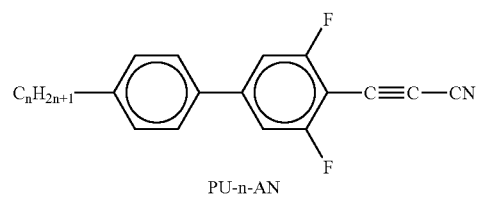
PU-n-AN
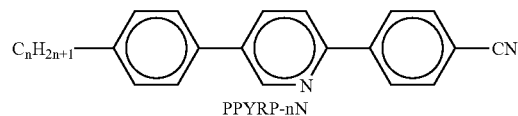
PPYRP-nN
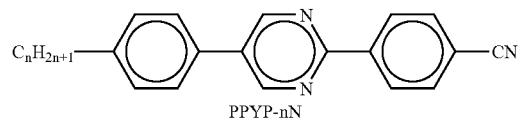
PPYP-nN
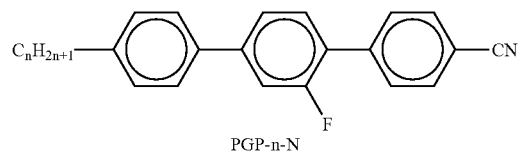
PGP-n-N
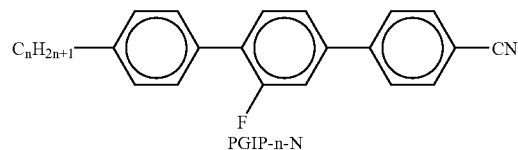
PGIP-n-N
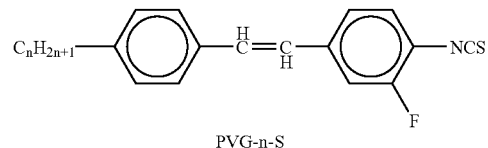
PVG-n-S
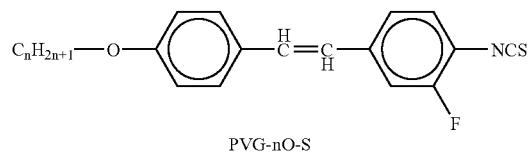
PVG-nO-S TABLE B-continued
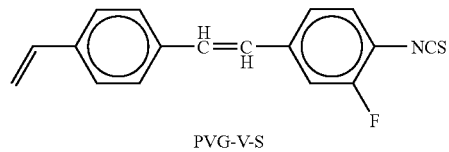
PVG-V-S
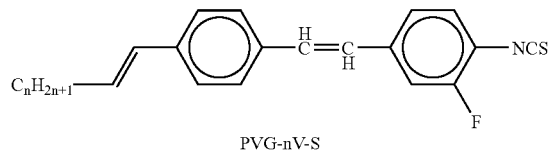
PVG-nV-S
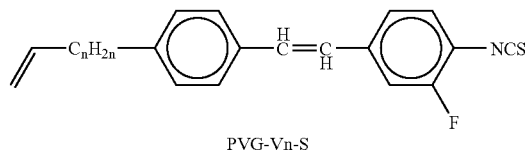
PVG-Vn-S
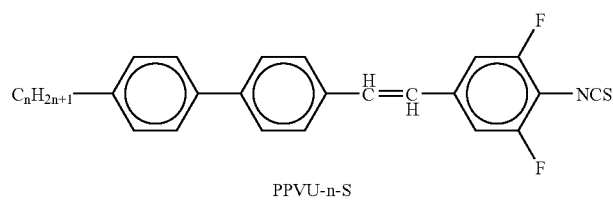
PPVU-n-S
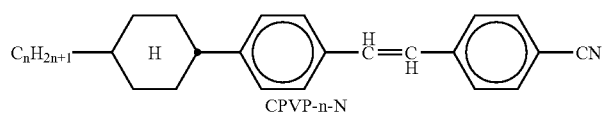
CPVP-n-N
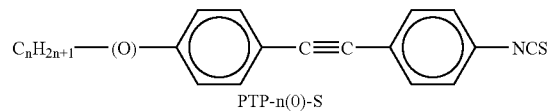
PTP-n(0)-S
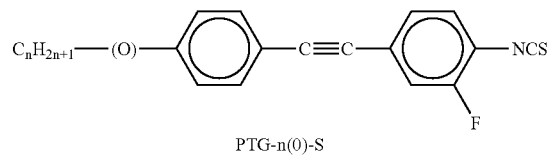
PTG-n(0)-S
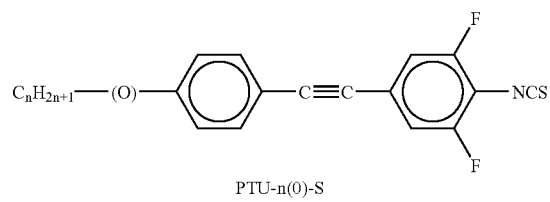
PTU-n(0)-S
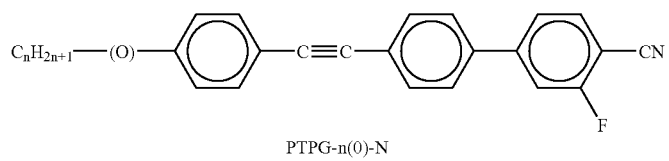
PTPG-n(0)-N
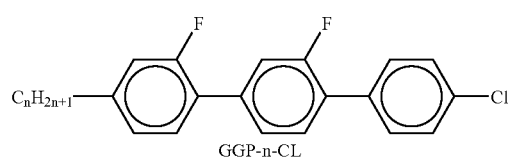
GGP-n-CL TABLE B-continued
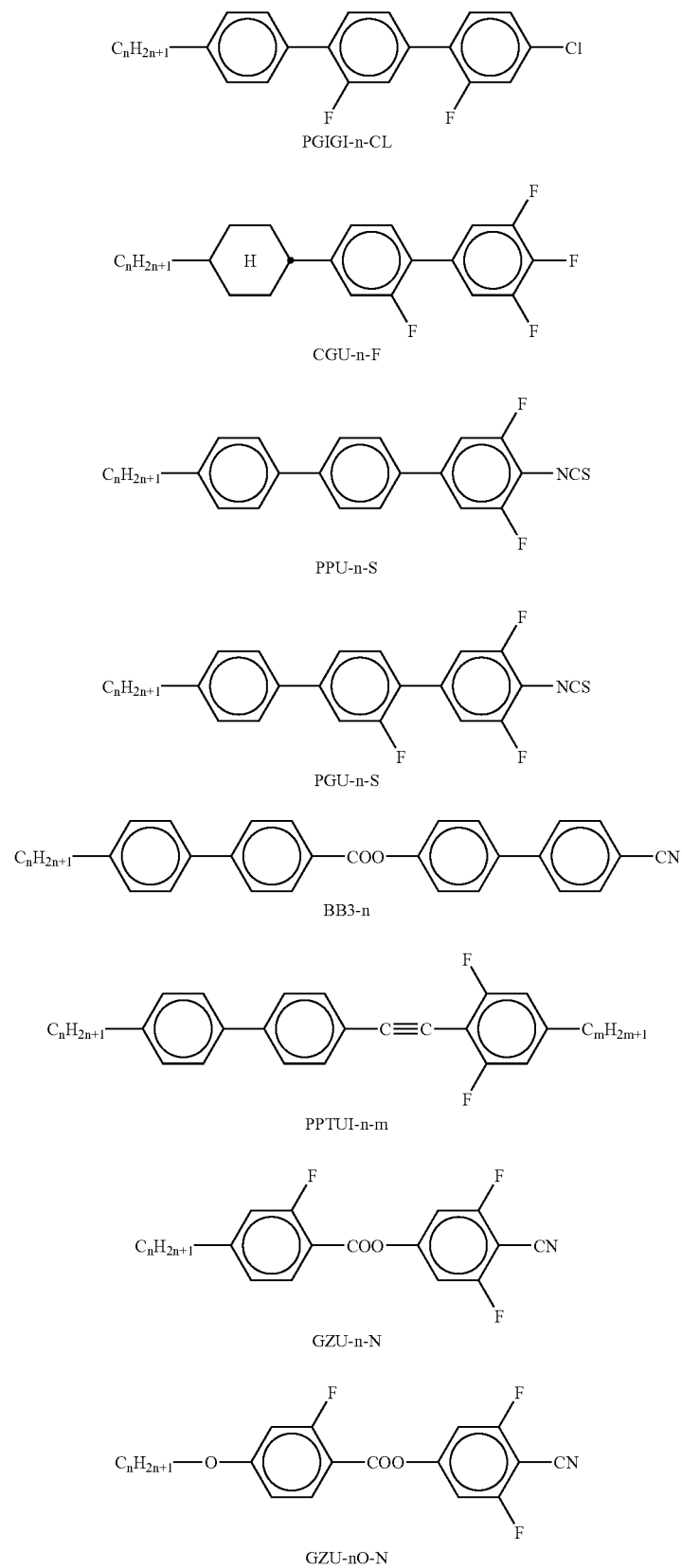

TABLE B-continued
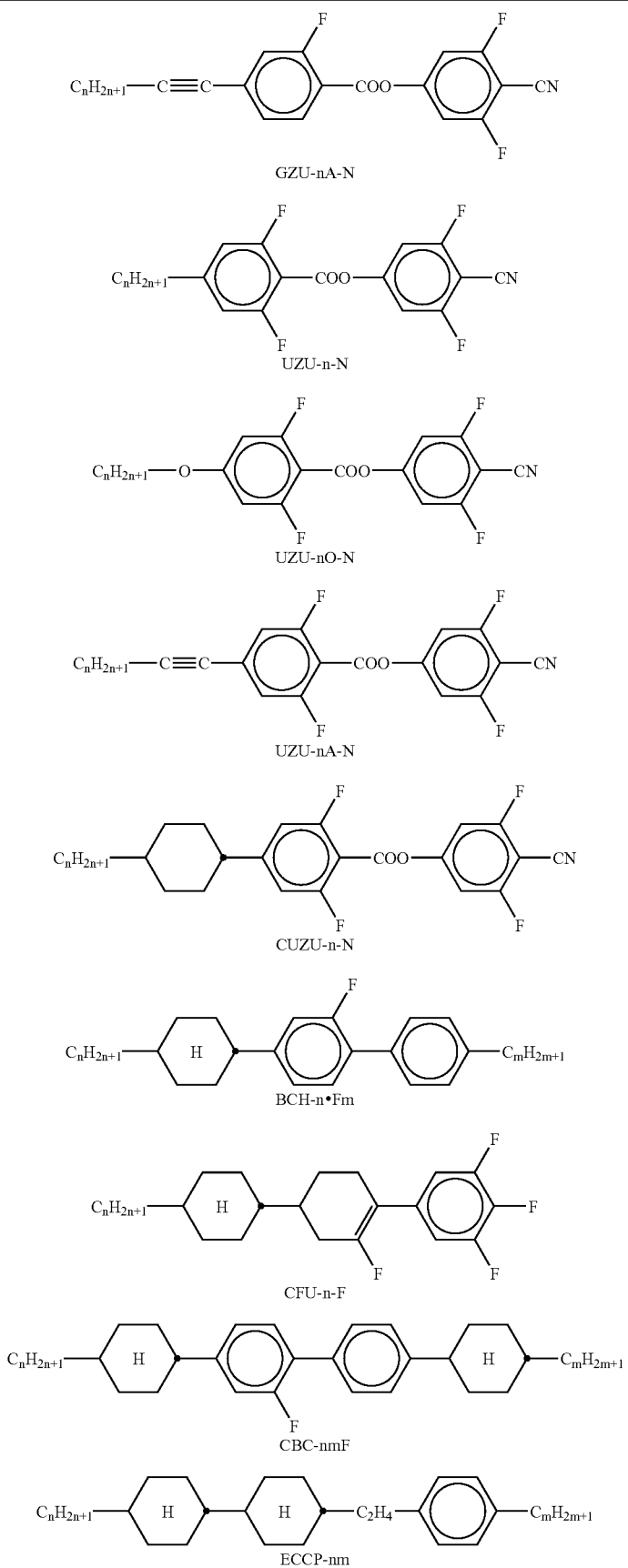

TABLE B-continued
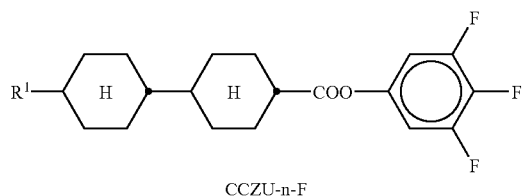
CCZU-n-F
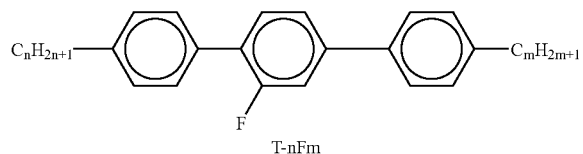
T-nFm
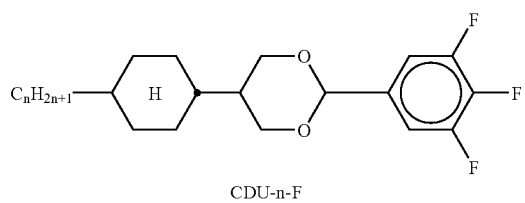
CDU-n-F
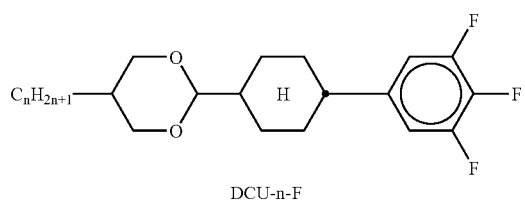
DCU-n-F
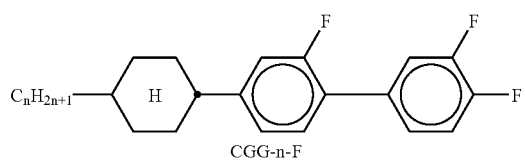
CGG-n-F
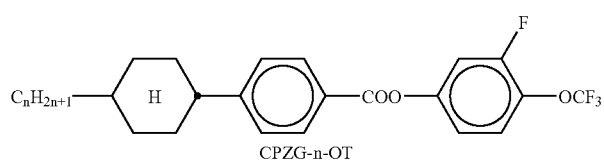
CPZG-n-OT
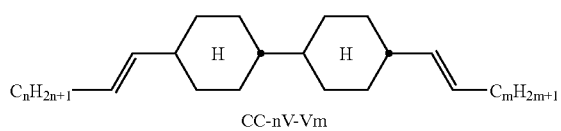
CC-nV-Vm
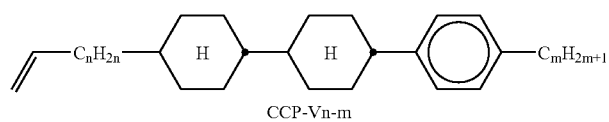
CCP-Vn-m
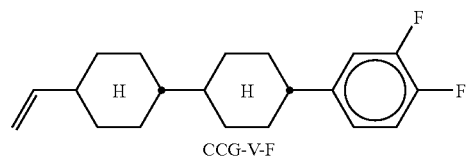
CCG-V-F TABLE B-continued
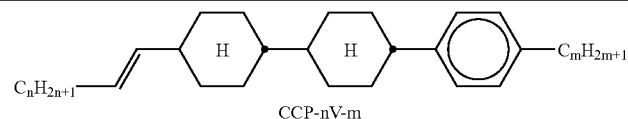
CCP-nV-m
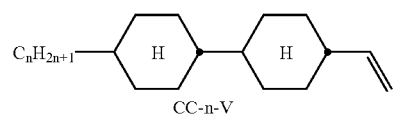
CC-n-V
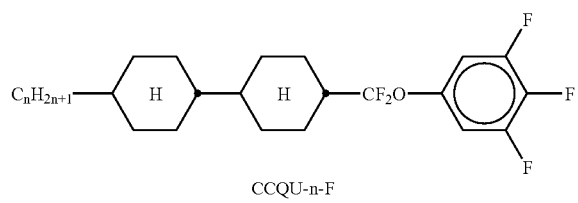
CCQU-n-F
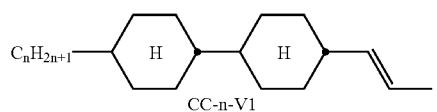
CC-n-V1
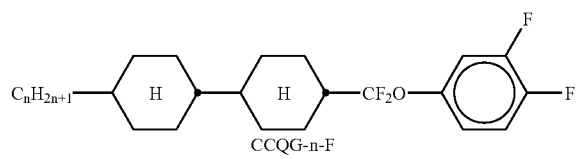
CCQG-n-F
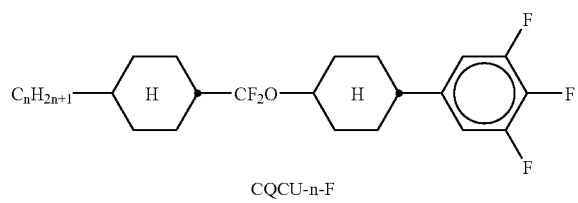
CQCU-n-F
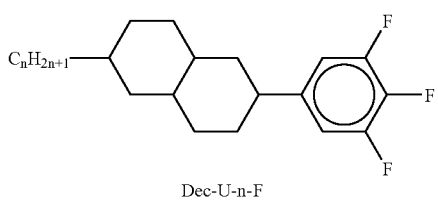
Dec-U-n-F
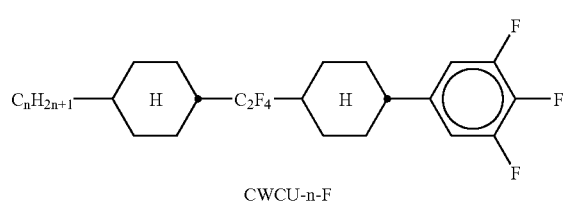
CWCU-n-F
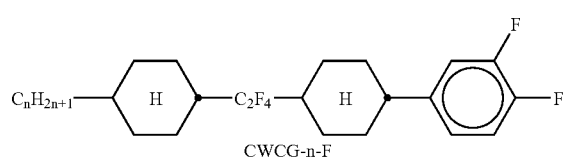
CWCG-n-F
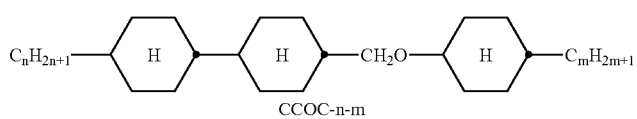
CCOC-n-m TABLE B-continued
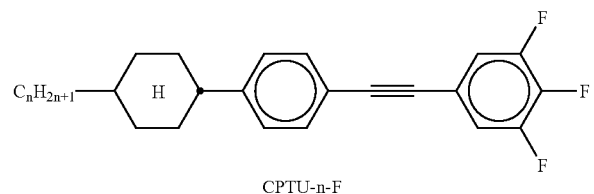
CPTU-n-F
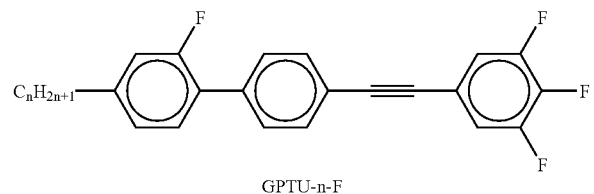
GPTU-n-F
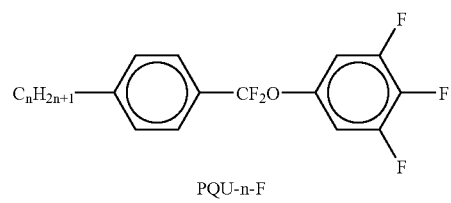
PQU-n-F
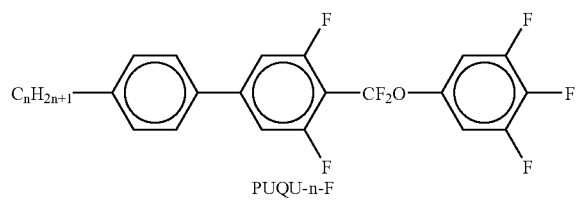
PUQU-n-F
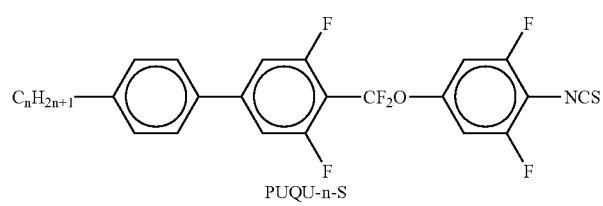
PUQU-n-S
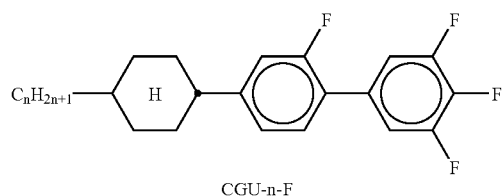
CGU-n-F
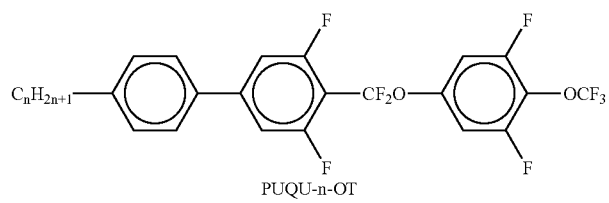
PUQU-n-OT
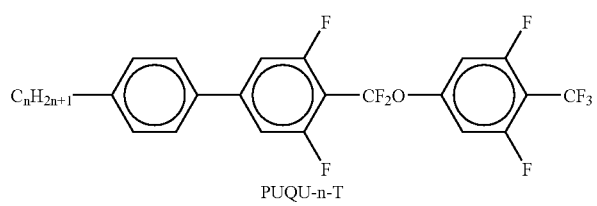
PUQU-n-T TABLE B-continued
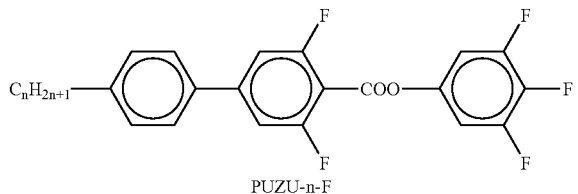
PUZU-n-F
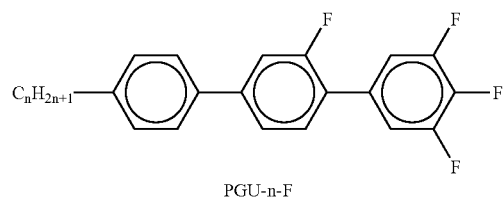
PGU-n-F
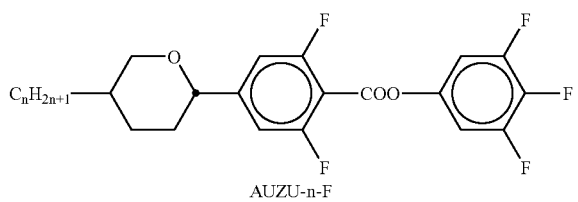
AUZU-n-F
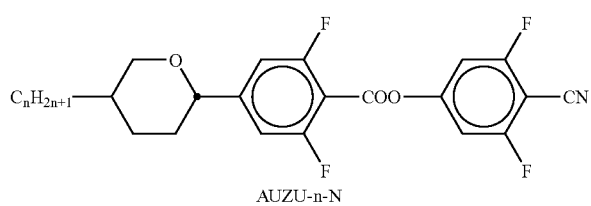
AUZU-n-N
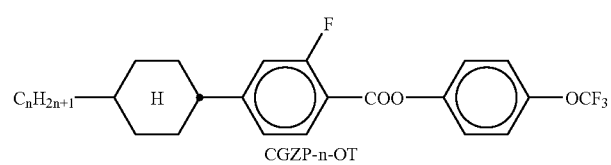
CGZP-n-OT
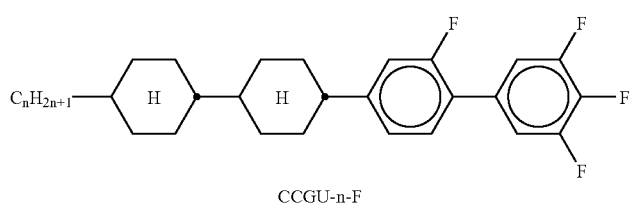
CCGU-n-F
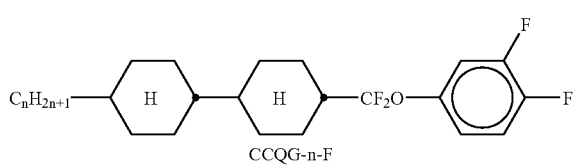
CCQG-n-F
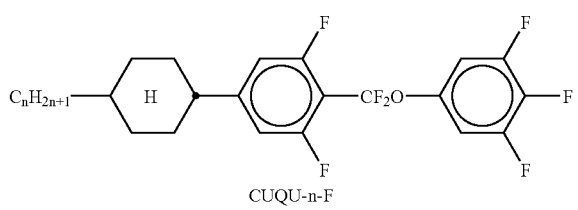
CUQU-n-F TABLE B-continued
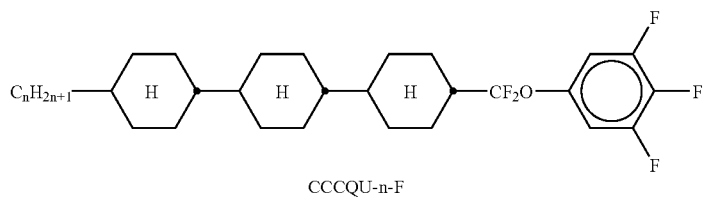
CCCQU-n-F
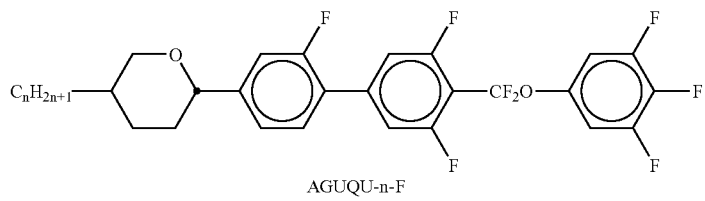
AGUQU-n-F
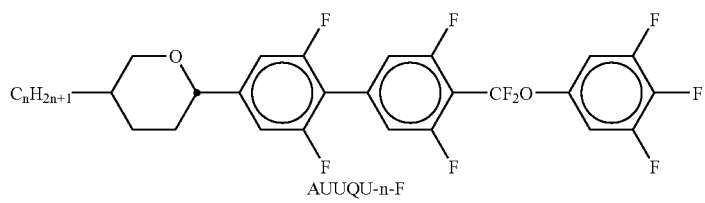
AUUQU-n-F
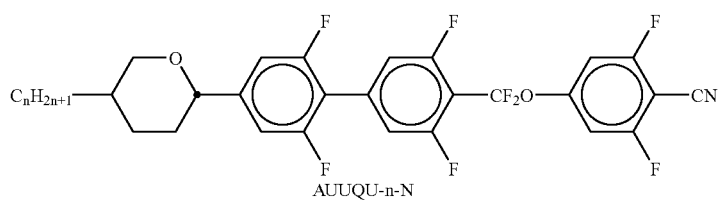
AUUQU-n-N
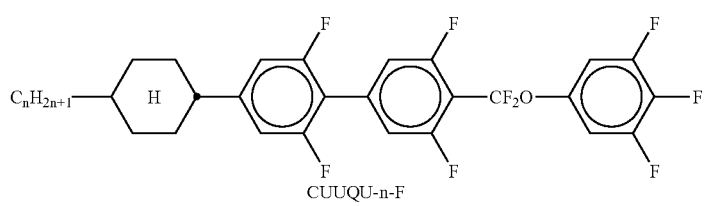
CUUQU-n-F
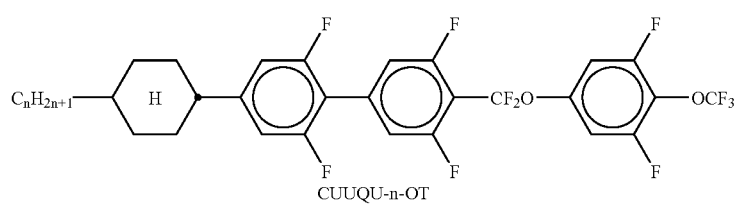
CUUQU-n-OT
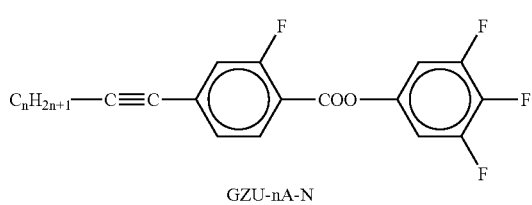
GZU-nA-N
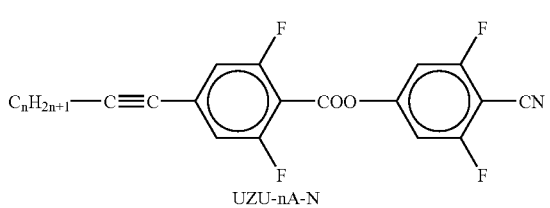
UZU-nA-N TABLE B-continued

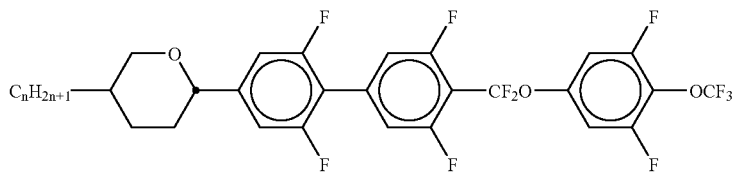

AUUQU-n-OT

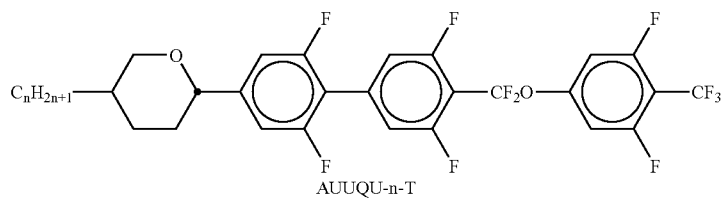

AUUQU-n-T

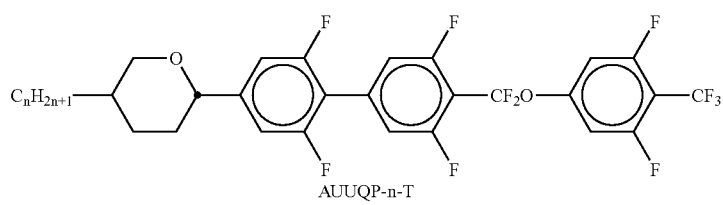

AUUQP-n-T

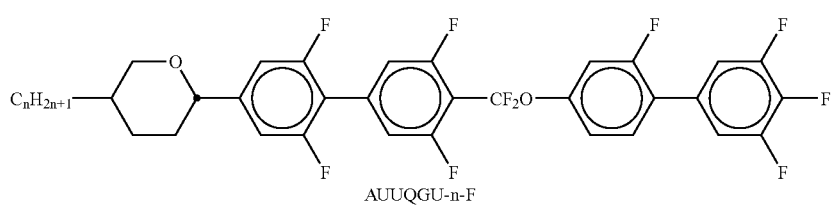

AUUQGU-n-F

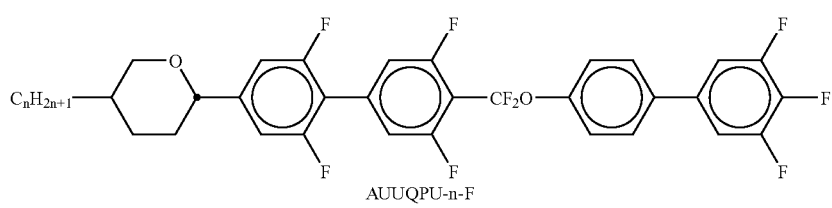

AUUQPU-n-F

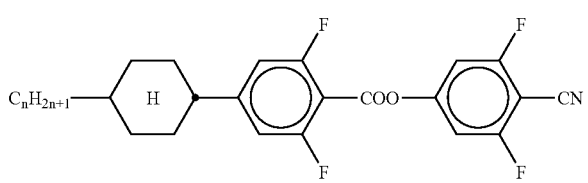

CUZP-nN•F•F

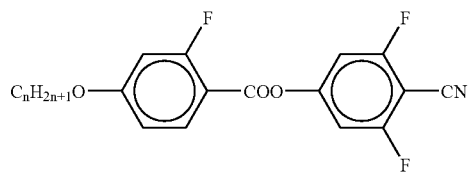

GZU-nO-N

Particular preference is given to liquid-crystalline mixtures which, besides the compounds of the formula I, comprise at least one, two, three or four compounds from Table B.

Table C shows possible dopants according to component D which are generally added to the mixtures alone or in combination two, three or more) according to the invention.

TABLE C
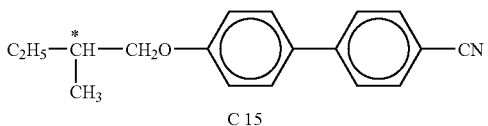
C 15
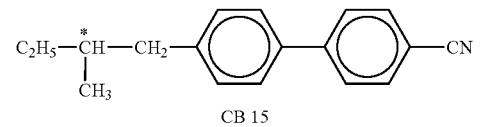
CB 15
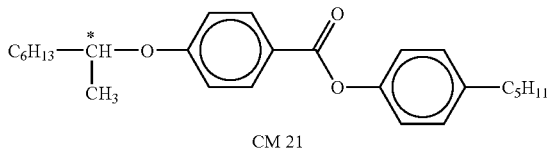
CM 21
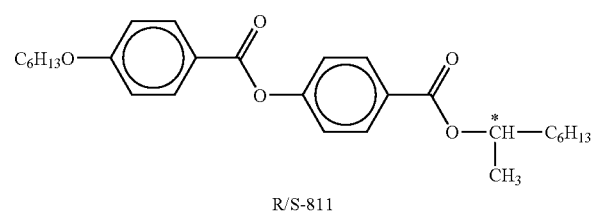
R/S-811
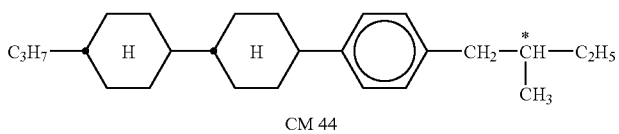
CM 44
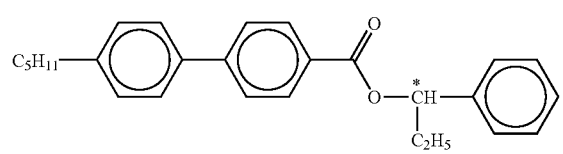
CM 45
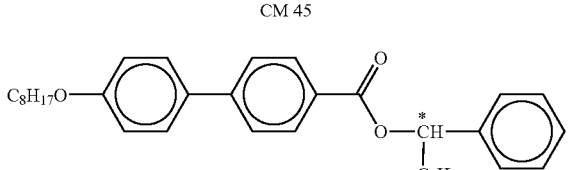
CM 47
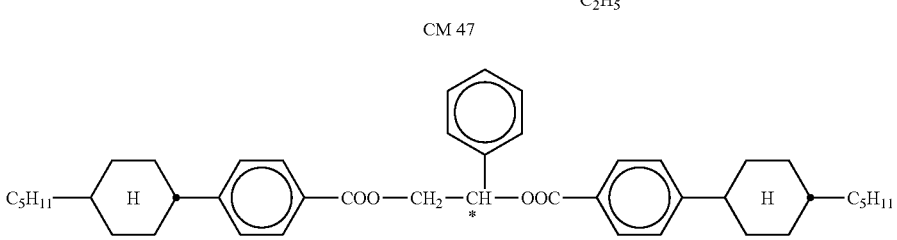
R/S-1011
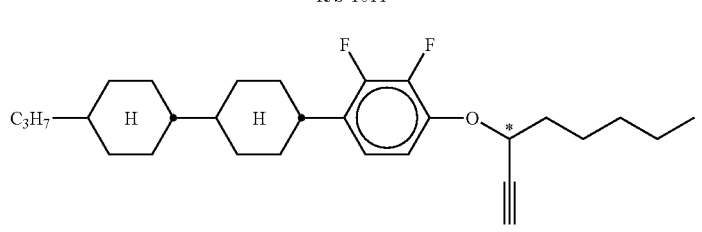
R/S-3011

TABLE C-continued

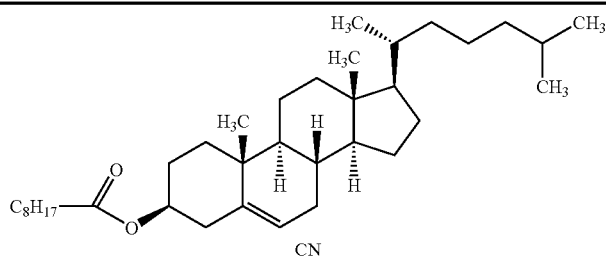

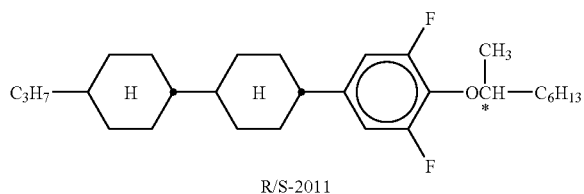

R/S-2011

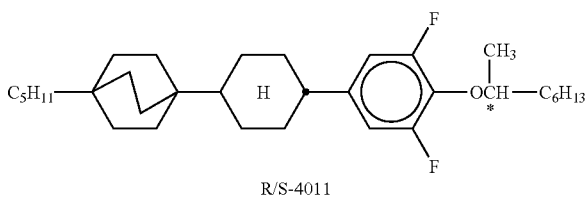

R/S-4011

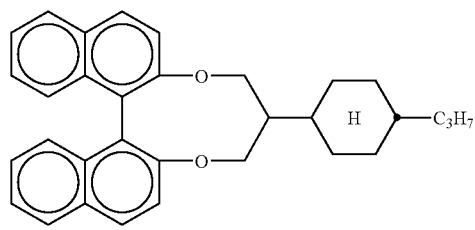

R/S-5011

The liquid crystal media according to the instant invention do contain preferably
- four or more compounds selected from the group of compounds of tables A and B and/or
- five or more compounds selected from the group of compounds of table B and/or
- two or more compounds selected from the group of compounds of table A.

EXAMPLES

The examples given in the following are illustrating the present invention without limiting it in any way.

However, the physical data especially of the compounds illustrate to the expert which properties can be achieved in which ranges. Especially the combination of the various properties, which can be preferably achieved, is thus well defined.

Example 1

Preparation of 6

The compound 6 is prepared according to the following reaction scheme

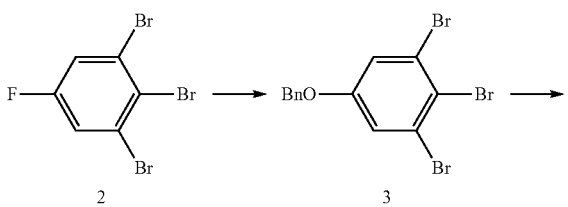

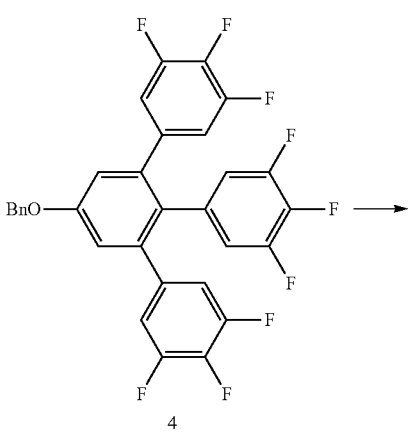

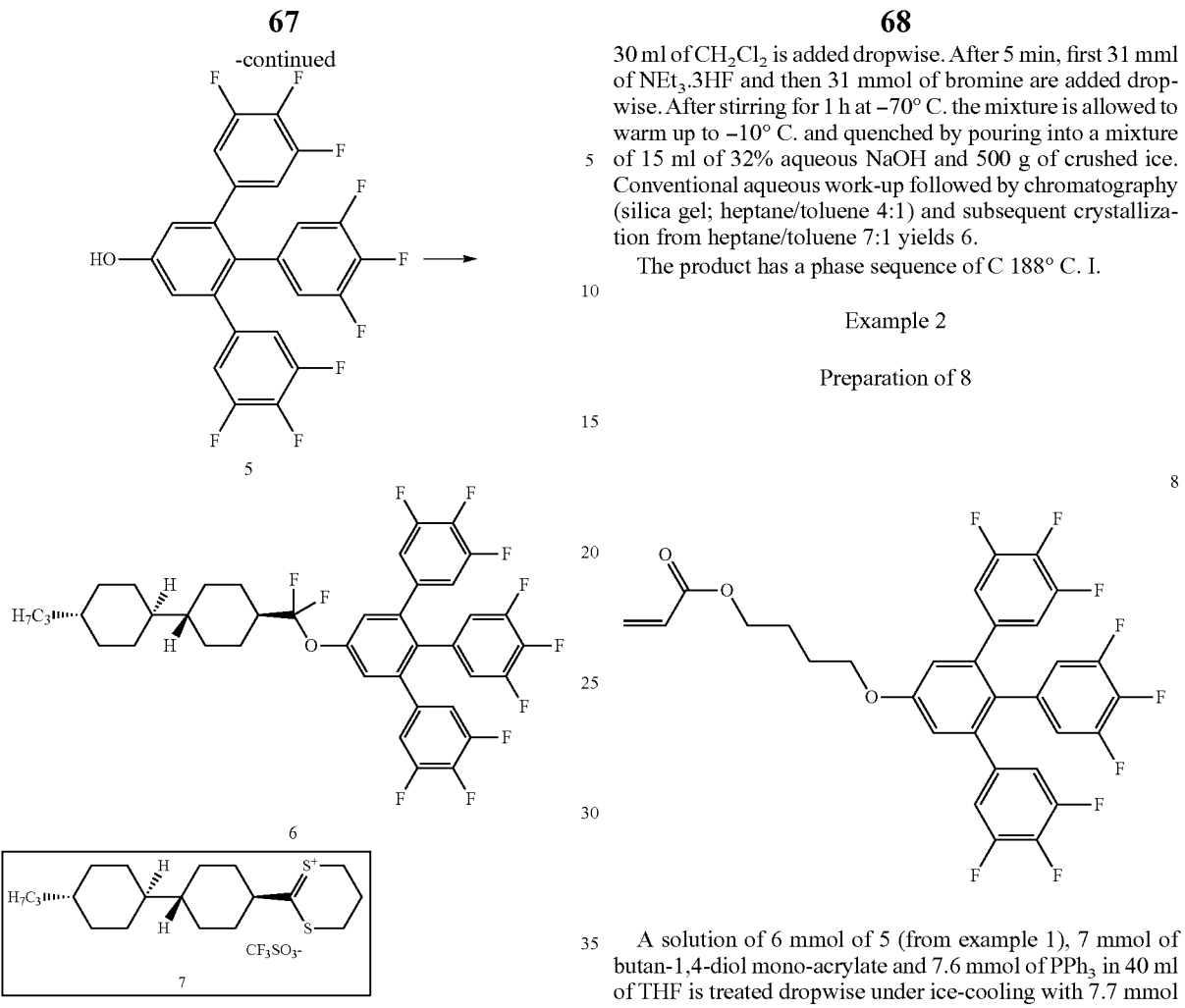

Step 1.1: Preparation of 3

A solution of 0.3 mol of benzyl alcohol in 50 ml of triglyme is slowly added to a suspension of 0.3 mol of NaH in 120 ml of triglyme at a temperature of 40° C. The mixture is then stirred for 18 h, subsequently a 50° C. warm solution of 0.14 mol of 2 in 180 ml of triglyme is added dropwise and the reaction mixture is heated for 3 h to 80° C. The product is isolated by conventional aqueous work-up and purified by chromatography (over silica gel with heptane/toluene 3:2 as eluent) and subsequent crystallization from heptane to yield 3.

Step 1.2: Preparation of 4

A mixture of 3 (56 mmol), 3,4,5-trifluorobenzene boronic acid (281 mmol), sodium metaborate octahydrate (224 mmol), water (400 ml), THF (900 ml), $PdCl_2(PPh_3)_2$ (3.9 g) and $N_2H_4$—$H_2O$ (2 ml) is heated under refluxed under nitrogen atmosphere for 18 h. The product is isolated by conventional aqueous work-up and purified by chromatography (over silica gel with heptane/toluene 7:3 as eluent) and subsequent crystallization from toluene to yield 4 with m.p. 129° C.

Step 1.3: Preparation of 5

A solution of 9 g of 4 in 180 ml of THF is hydrogenated in the presence of 1.8 g of 5% of wet Pd—C (containing 56% of water). The mixture is filtered and evaporated to dryness, yielding 5 as a colourless solid.

Step 1.4: Preparation of 6

A solution of 6 mmol of 7 in 30 ml of $CH_2Cl_2$ is cooled to −70° C. Then, a mixture of 8.4 mmol of 5, 1.5 ml of $NEt_3$ and 30 ml of $CH_2Cl_2$ is added dropwise. After 5 min, first 31 mml of $NEt_3$.3HF and then 31 mmol of bromine are added dropwise. After stirring for 1 h at −70° C. the mixture is allowed to warm up to −10° C. and quenched by pouring into a mixture of 15 ml of 32% aqueous NaOH and 500 g of crushed ice. Conventional aqueous work-up followed by chromatography (silica gel; heptane/toluene 4:1) and subsequent crystallization from heptane/toluene 7:1 yields 6.

The product has a phase sequence of C 188° C. I.

Example 2

Preparation of 8

A solution of 6 mmol of 5 (from example 1), 7 mmol of butan-1,4-diol mono-acrylate and 7.6 mmol of $PPh_3$ in 40 ml of THF is treated dropwise under ice-cooling with 7.7 mmol of diisopropyl diazodicarboxylate. The resultant reaction mixture is stirred for 2.5 h, then subjected to conventional aqueous work-up and subsequently purified by chromatography (silica gel; $CH_2Cl_2$) to yield 8. The product has the following phase sequence: $T_g$ 12° C. C 98° C. I.

Example 3

Analogously to example 1 the following compound (9) is prepared:

The product has a phase sequence of C 152° C. I.

Example 4

Analogously to example 2 the following compound (10) is prepared:

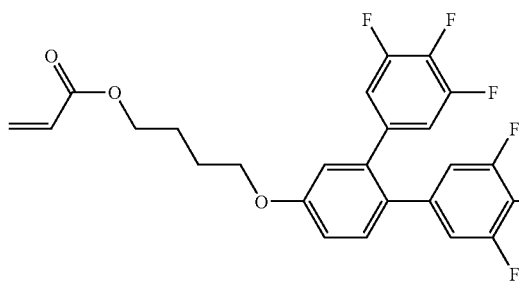

The product has a phase sequence of $T_g$ −18° C. C 109° C. I.

Example 5

Analogously to example 1 the following compound (II) is prepared:

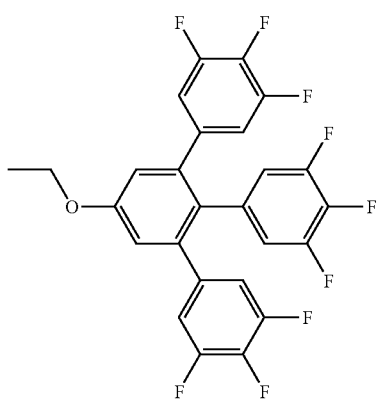

The product has a phase sequence of $T_g$ 36° C. C 127° C. I.

Example 6

Analogously to example 1 the following compound (12) is prepared:

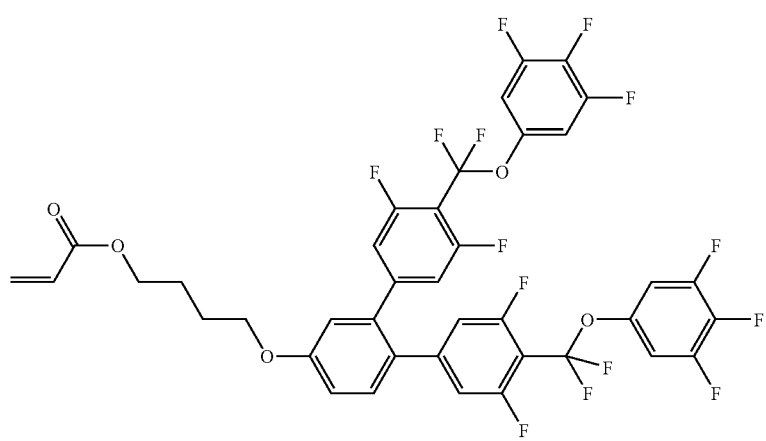

The product has a phase sequence of $T_g$ −17° C. I.

Examples 7 to 57

Analogously to example 1 the following compounds are prepared:

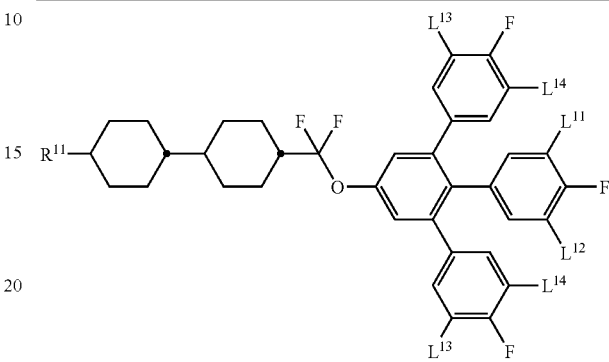

| No. | $R^{11}$ | $L^{11}$ | $L^{12}$ | $L^{13}$ | $L^{14}$ | Phases (T/° C.) |
|---|---|---|---|---|---|---|
| 7 | $CH_3$ | H | H | H | H | |
| 8 | $C_2H_5$ | H | H | H | H | |
| 9 | n-$C_3H_7$ | H | H | H | H | C 188° C. I |
| 10 | n-$C_4H_9$ | H | H | H | H | |
| 11 | n-$C_5H_{11}$ | H | H | H | H | |
| 12 | n-$C_6H_{13}$ | H | H | H | H | |
| 13 | n-$C_7H_{15}$ | H | H | H | H | |
| 14 | n-$C_8H_{17}$ | H | H | H | H | |
| 15 | n-$C_9H_{19}$ | H | H | H | H | |
| 16 | n-$C_{10}H_{21}$ | H | H | H | H | |
| 17 | $CH_2$=CH | H | H | H | H | |
| 18 | $CH_2$=CH—$CH_2$ | H | H | H | H | |
| 19 | $CH_3$—CH=CH | H | H | H | H | |
| 20 | $CH_3$ | H | H | F | F | |
| 21 | $C_2H_5$ | H | H | F | F | |
| 22 | n-$C_3H_7$ | H | H | F | F | |
| 23 | n-$C_4H_9$ | H | H | F | F | |
| 24 | n-$C_5H_{11}$ | H | H | F | F | |
| 25 | n-$C_6H_{13}$ | H | H | F | F | |
| 26 | n-$C_7H_{15}$ | H | H | F | F | |
| 27 | n-$C_8H_{17}$ | H | H | F | F | |
| 28 | n-$C_9H_{19}$ | H | H | F | F | |
| 29 | n-$C_{10}H_{21}$ | H | H | F | F | |
| 30 | $CH_2$=CH | H | H | F | F | |

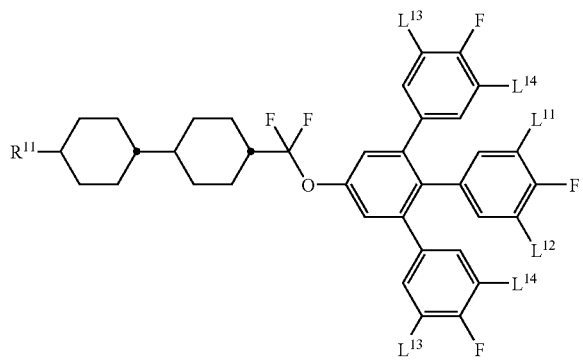

| No. | R¹¹ | L¹¹ | L¹² | L¹³ | L¹⁴ | Phases (T/° C.) |
|---|---|---|---|---|---|---|
| 31 | CH$_2$=CH—CH$_2$ | H | H | F | F | |
| 32 | CH$_3$—CH=CH | H | H | F | F | |
| 33 | CH$_3$ | H | F | H | F | |
| 34 | C$_2$H$_5$ | H | F | H | F | |
| 35 | n-C$_3$H$_7$ | H | F | H | F | |
| 36 | n-C$_4$H$_9$ | H | F | H | F | |
| 37 | n-C$_5$H$_{11}$ | H | F | H | F | |
| 38 | n-C$_6$H$_{13}$ | H | F | H | F | |
| 39 | n-C$_7$H$_{15}$ | H | F | H | F | |
| 40 | n-C$_8$H$_{17}$ | H | F | H | F | |
| 41 | n-C$_9$H$_{19}$ | H | F | H | F | |
| 42 | n-C$_{10}$H$_{21}$ | H | F | H | F | |
| 43 | CH$_2$=CH | H | F | H | F | |
| 44 | CH$_2$=CH—CH$_2$ | H | F | H | F | |
| 45 | CH$_3$—CH=CH | H | F | H | F | |
| 46 | CH$_3$ | F | F | F | F | |
| 47 | C$_2$H$_5$ | F | F | F | F | |
| 1 | n-C$_3$H$_7$ | F | F | F | F | C 188° C. I |
| 48 | n-C$_4$H$_9$ | F | F | F | F | |
| 49 | n-C$_5$H$_{11}$ | F | F | F | F | |
| 50 | n-C$_6$H$_{13}$ | F | F | F | F | |
| 51 | n-C$_7$H$_{15}$ | F | F | F | F | |
| 52 | n-C$_8$H$_{17}$ | F | F | F | F | |
| 53 | n-C$_9$H$_{19}$ | F | F | F | F | |
| 54 | n-C$_{10}$H$_{21}$ | F | F | F | F | |
| 55 | CH$_2$=CH | F | F | F | F | |
| 56 | CH$_2$=CH—CH$_2$ | F | F | F | F | |
| 57 | CH$_3$—CH=CH | F | F | F | F | |

Examples 58 to 121

Analogously to example 3 the following compounds are prepared:

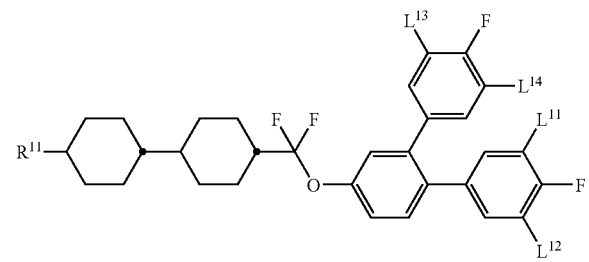

| No. | R¹¹ | L¹¹ | L¹² | L¹³ | L¹⁴ | Phases (T/° C.) |
|---|---|---|---|---|---|---|
| 58 | CH$_3$ | H | H | H | H | |
| 59 | C$_2$H$_5$ | H | H | H | H | |
| 60 | n-C$_3$H$_7$ | H | H | H | H | |
| 61 | n-C$_4$H$_9$ | H | H | H | H | |
| 62 | n-C$_5$H$_{11}$ | H | H | H | H | |
| 63 | n-C$_6$H$_{13}$ | H | H | H | H | |
| 64 | n-C$_7$H$_{15}$ | H | H | H | H | |
| 65 | n-C$_8$H$_{17}$ | H | H | H | H | |
| 66 | n-C$_9$H$_{19}$ | H | H | H | H | |
| 67 | n-C$_{10}$H$_{21}$ | H | H | H | H | |
| 68 | CH$_2$=CH | H | H | H | H | |
| 69 | CH$_2$=CH—CH$_2$ | H | H | H | H | |
| 70 | CH$_3$—CH=CH | H | H | H | H | |
| 71 | CH$_3$ | F | F | H | H | |
| 72 | C$_2$H$_5$ | F | F | H | H | |
| 73 | n-C$_3$H$_7$ | F | F | H | H | |
| 74 | n-C$_4$H$_9$ | F | F | H | H | |
| 75 | n-C$_5$H$_{11}$ | F | F | H | H | |
| 76 | n-C$_6$H$_{13}$ | F | F | H | H | |
| 77 | n-C$_7$H$_{15}$ | F | F | H | H | |
| 78 | n-C$_8$H$_{17}$ | F | F | H | H | |
| 79 | n-C$_9$H$_{19}$ | F | F | H | H | |
| 80 | n-C$_{10}$H$_{21}$ | F | F | H | H | |
| 81 | CH$_2$=CH | F | F | H | H | |
| 82 | CH$_2$=CH—CH$_2$ | F | F | H | H | |
| 83 | CH$_3$—CH=CH | F | F | H | H | |
| 84 | CH$_3$ | F | H | F | H | |
| 85 | C$_2$H$_5$ | F | H | F | H | |
| 86 | n-C$_3$H$_7$ | F | H | F | H | |
| 87 | n-C$_4$H$_9$ | F | H | F | H | |
| 88 | n-C$_5$H$_{11}$ | F | H | F | H | |
| 89 | n-C$_6$H$_{13}$ | F | H | F | H | |
| 90 | n-C$_7$H$_{15}$ | F | H | F | H | |
| 91 | n-C$_8$H$_{17}$ | F | H | F | H | |
| 92 | n-C$_9$H$_{19}$ | F | H | F | H | |
| 93 | n-C$_{10}$H$_{21}$ | F | H | F | H | |
| 94 | CH$_2$=CH | F | H | F | H | |
| 95 | CH$_2$=CH—CH$_2$ | F | H | F | H | |
| 96 | CH$_3$—CH=CH | F | H | F | H | |
| 97 | CH$_3$ | H | H | F | F | |
| 98 | C$_2$H$_5$ | H | H | F | F | |
| 99 | n-C$_3$H$_7$ | H | H | F | F | |
| 100 | n-C$_4$H$_9$ | H | H | F | F | |
| 101 | n-C$_5$H$_{11}$ | H | H | F | F | |
| 102 | n-C$_6$H$_{13}$ | H | H | F | F | |
| 103 | n-C$_7$H$_{15}$ | H | H | F | F | |
| 104 | n-C$_8$H$_{17}$ | H | H | F | F | |
| 105 | n-C$_9$H$_{19}$ | H | H | F | F | |
| 106 | n-C$_{10}$H$_{21}$ | H | H | F | F | |
| 107 | CH$_2$=CH | H | H | F | F | |
| 108 | CH$_2$=CH—CH$_2$ | H | H | F | F | |
| 109 | CH$_3$—CH=CH | H | H | F | F | |
| 110 | CH$_3$ | F | F | F | F | |
| 111 | C$_2$H$_5$ | F | F | F | F | |
| 3 | n-C$_3$H$_7$ | F | F | F | F | T$_g$ 12° C. C 98° C. I |
| 112 | n-C$_4$H$_9$ | F | F | F | F | |
| 113 | n-C$_5$H$_{11}$ | F | F | F | F | |
| 114 | n-C$_6$H$_{13}$ | F | F | F | F | |
| 115 | n-C$_7$H$_{15}$ | F | F | F | F | |
| 116 | n-C$_8$H$_{17}$ | F | F | F | F | |
| 117 | n-C$_9$H$_{19}$ | F | F | F | F | |
| 118 | n-C$_{10}$H$_{21}$ | F | F | F | F | |
| 119 | CH$_2$=CH | F | F | F | F | |
| 120 | CH$_2$=CH—CH$_2$ | F | F | F | F | |
| 121 | CH$_3$—CH=CH | F | F | F | F | |

Examples 122 to 157

Analogously to example 5 the following compounds are prepared:

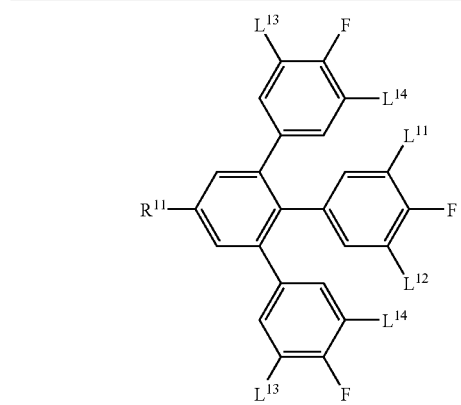

| No. | $R^{13}$ | $L^{11}$ | $L^{12}$ | $L^{13}$ | $L^{14}$ | Phases (T/° C.) |
|---|---|---|---|---|---|---|
| 122 | $CH_3$—O | H | H | H | H | |
| 123 | $C_2H_5$—O | H | H | H | H | |
| 124 | $n$-$C_3H_7$—O | H | H | H | H | |
| 125 | $n$-$C_5H_{11}$—O | H | H | H | H | |
| 126 | $CH_3$—O | F | H | H | H | |
| 127 | $C_2H_5$—O | F | H | H | H | |
| 128 | $n$-$C_3H_7$—O | F | H | H | H | |
| 129 | $n$-$C_5H_{11}$—O | F | H | H | H | |
| 130 | $CH_3$—O | H | H | F | H | |
| 131 | $C_2H_5$—O | H | H | F | H | |
| 132 | $n$-$C_3H_7$—O | H | H | F | H | |
| 133 | $n$-$C_5H_{11}$—O | H | H | F | H | |
| 134 | $CH_3$—O | F | H | F | H | |
| 135 | $C_2H_5$—O | F | H | F | H | |
| 136 | $n$-$C_3H_7$—O | F | H | F | H | |
| 137 | $n$-$C_5H_{11}$—O | F | H | F | H | |
| 138 | $CH_3$—O | F | F | H | H | |
| 139 | $C_2H_5$—O | F | F | H | H | |
| 140 | $n$-$C_3H_7$—O | F | F | H | H | |
| 141 | $n$-$C_5H_{11}$—O | F | F | H | H | |
| 142 | $CH_3$—O | H | H | F | F | |
| 143 | $C_2H_5$—O | H | H | F | F | |
| 144 | $n$-$C_3H_7$—O | H | H | F | F | |
| 145 | $n$-$C_5H_{11}$—O | H | H | F | F | |
| 146 | H | F | F | F | H | |
| 147 | $C_2H_5$—O | F | F | F | H | |
| 148 | $n$-$C_3H_7$—O | F | F | F | H | |
| 149 | $n$-$C_5H_{11}$—O | F | F | F | H | |
| 150 | $CH_3$—O | H | F | F | F | |
| 151 | $C_2H_5$—O | H | F | F | F | |
| 152 | $n$-$C_3H_7$—O | H | F | F | F | |
| 153 | $n$-$C_5H_{11}$—O | H | F | F | F | |
| 154 | $CH_3$—O | F | F | F | F | |
| 155 | $C_2H_5$—O | F | F | F | F | |
| 5 | $C_2H_5$—O | | | | | $T_g$ 36° C. C 127° C. I |
| 156 | $n$-$C_3H_7$—O | F | F | F | F | |
| 157 | $n$-$C_5H_{11}$—O | F | F | F | F | |

Examples 158 to 208

Analogously to example 1 the following compounds are prepared:

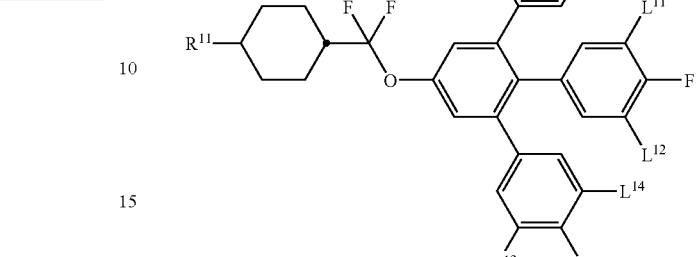

| No. | $R^{11}$ and $R^{12}$ | $L^{11}$ | $L^{12}$ | $L^{13}$ | $L^{14}$ | Phases (T/° C.) |
|---|---|---|---|---|---|---|
| 158 | H | H | H | H | H | |
| 159 | $CH_3$ | H | H | H | H | |
| 160 | $n$-$C_3H_7$ | H | H | H | H | |
| 161 | $n$-$C_5H_{11}$ | H | H | H | H | |
| 162 | H | F | H | H | H | |
| 163 | $CH_3$ | F | H | H | H | |
| 164 | $n$-$C_3H_7$ | F | H | H | H | |
| 165 | $n$-$C_5H_{11}$ | F | H | H | H | |
| 166 | H | H | H | F | H | |
| 167 | $CH_3$ | H | H | F | H | |
| 168 | $n$-$C_3H_7$ | H | H | F | H | |
| 169 | $n$-$C_5H_{11}$ | H | H | F | H | |
| 170 | H | F | H | F | H | |
| 186 | $CH_3$ | F | H | F | H | |
| 187 | $n$-$C_3H_7$ | F | H | F | H | |
| 188 | $n$-$C_5H_{11}$ | F | H | F | H | |
| 189 | H | F | F | H | H | |
| 190 | $CH_3$ | F | F | H | H | |
| 191 | $n$-$C_3H_7$ | F | F | H | H | |
| 192 | $n$-$C_5H_{11}$ | F | F | H | H | |
| 193 | H | H | H | F | F | |
| 194 | $CH_3$ | H | H | F | F | |
| 195 | $n$-$C_3H_7$ | H | H | F | F | |
| 196 | $n$-$C_5H_{11}$ | H | H | F | F | |
| 197 | H | F | F | F | H | |
| 198 | $CH_3$ | F | F | F | H | |
| 199 | $n$-$C_3H_7$ | F | F | F | H | |
| 200 | $n$-$C_5H_{11}$ | F | F | F | H | |
| 201 | H | H | F | F | F | |
| 202 | $CH_3$ | H | F | F | F | |
| 203 | $n$-$C_3H_7$ | H | F | F | F | |
| 204 | $n$-$C_5H_{11}$ | H | F | F | F | |
| 205 | H | F | F | F | F | |
| 206 | $CH_3$ | F | F | F | F | |
| 207 | $n$-$C_3H_7$ | F | F | F | F | |
| 208 | $n$-$C_5H_{11}$ | F | F | F | F | |

Examples 209 to 275

Analogously to example 3 the following compounds are prepared:

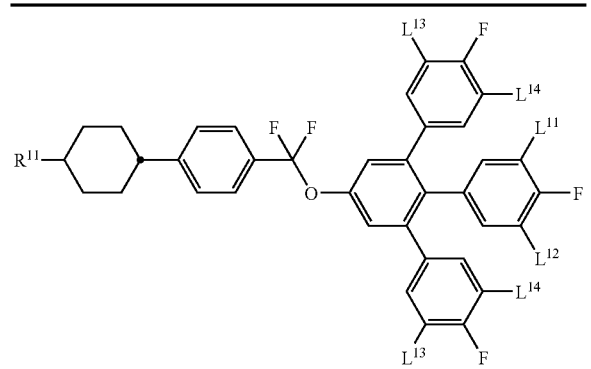

| No. | $R^{13}$ | $L^{11}$ | $L^{12}$ | $L^{13}$ | $L^{14}$ | Phases (T/° C.) |
|---|---|---|---|---|---|---|
| 209 | $CH_3$ | H | H | H | H | |
| 210 | $C_2H_5$ | H | H | H | H | |
| 213 | $n-C_3H_7$ | H | H | H | H | |
| 214 | $n-C_4H_9$ | H | H | H | H | |
| 215 | $n-C_5H_{11}$ | H | H | H | H | |
| 216 | $n-C_6H_{13}$ | H | H | H | H | |
| 217 | $n-C_7H_{15}$ | H | H | H | H | |
| 218 | $n-C_8H_{17}$ | H | H | H | H | |
| 219 | $n-C_9H_{19}$ | H | H | H | H | |
| 220 | $n-C_{10}H_{21}$ | H | H | H | H | |
| 221 | $CH_2=CH$ | H | H | H | H | |
| 222 | $CH_2=CH-CH_2$ | H | H | H | H | |
| 223 | $CH_3-CH=CH$ | H | H | H | H | |
| 224 | $CH_3$ | F | F | H | H | |
| 225 | $C_2H_5$ | F | F | H | H | |
| 226 | $n-C_3H_7$ | F | F | H | H | C 126° C. I |
| 227 | $n-C_4H_9$ | F | F | H | H | |
| 228 | $n-C_5H_{11}$ | F | F | H | H | |
| 229 | $n-C_6H_{13}$ | F | F | H | H | |
| 230 | $n-C_7H_{15}$ | F | F | H | H | |
| 231 | $n-C_8H_{17}$ | F | F | H | H | |
| 232 | $n-C_9H_{19}$ | F | F | H | H | |
| 233 | $n-C_{10}H_{21}$ | F | F | H | H | |
| 234 | $CH_2=CH$ | F | F | H | H | |
| 235 | $CH_2=CH-CH_2$ | F | F | H | H | |
| 236 | $CH_3-CH=CH$ | F | F | H | H | |
| 237 | $CH_3$ | F | H | F | H | |
| 238 | $C_2H_5$ | F | H | F | H | |
| 239 | $n-C_3H_7$ | F | H | F | H | |
| 240 | $n-C_4H_9$ | F | H | F | H | |
| 241 | $n-C_5H_{11}$ | F | H | F | H | |
| 242 | $n-C_6H_{13}$ | F | H | F | H | |
| 243 | $n-C_7H_{15}$ | F | H | F | H | |
| 244 | $n-C_8H_{17}$ | F | H | F | H | |
| 245 | $n-C_9H_{19}$ | F | H | F | H | |
| 246 | $n-C_{10}H_{21}$ | F | H | F | H | |
| 247 | $CH_2=CH$ | F | H | F | H | |
| 248 | $CH_2=CH-CH_2$ | F | H | F | H | |
| 249 | $CH_3-CH=CH$ | F | H | F | H | |
| 250 | $CH_3$ | H | H | F | F | |
| 251 | $C_2H_5$ | H | H | F | F | |
| 252 | $n-C_3H_7$ | H | H | F | F | |
| 253 | $n-C_4H_9$ | H | H | F | F | |
| 254 | $n-C_5H_{11}$ | H | H | F | F | |
| 255 | $n-C_6H_{13}$ | H | H | F | F | |
| 256 | $n-C_7H_{15}$ | H | H | F | F | |
| 257 | $n-C_8H_{17}$ | H | H | F | F | |
| 258 | $n-C_9H_{19}$ | H | H | F | F | |
| 259 | $n-C_{10}H_{21}$ | H | H | F | F | |
| 260 | $CH_2=CH$ | H | H | F | F | |
| 261 | $CH_2=CH-CH_2$ | H | H | F | F | |
| 262 | $CH_3-CH=CH$ | H | H | F | F | |
| 263 | $CH_3$ | F | F | F | F | |

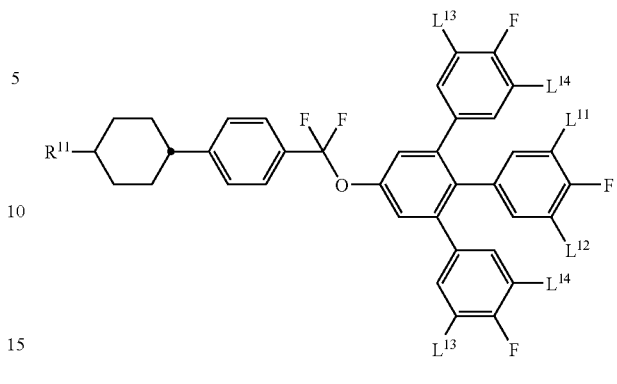

| No. | $R^{13}$ | $L^{11}$ | $L^{12}$ | $L^{13}$ | $L^{14}$ | Phases (T/° C.) |
|---|---|---|---|---|---|---|
| 264 | $C_2H_5$ | F | F | F | F | |
| 265 | $n-C_3H_7$ | F | F | F | F | |
| 266 | $n-C_4H_9$ | F | F | F | F | |
| 267 | $n-C_5H_{11}$ | F | F | F | F | |
| 268 | $n-C_6H_{13}$ | F | F | F | F | |
| 269 | $n-C_7H_{15}$ | F | F | F | F | |
| 270 | $n-C_8H_{17}$ | F | F | F | F | |
| 271 | $n-C_9H_{19}$ | F | F | F | F | |
| 272 | $n-C_{10}H_{21}$ | F | F | F | F | |
| 273 | $CH_2=CH$ | F | F | F | F | |
| 274 | $CH_2=CH-CH_2$ | F | F | F | F | |
| 275 | $CH_3-CH=CH$ | F | F | F | F | |

Comparative Use-Example

5% of the chiral agent R-5011 are solved in the achiral liquid crystal mixture H-0 with the composition and properties given in table 1 below.

TABLE 1

Composition and Properties of Host Mixture H—O

| Compound Abbreviation | Concentration/ mass-% | Physical Properties |
|---|---|---|
| GZU-3A-N | 15.0 | T(N, I) = 56.5° C. |
| GZU-4A-N | 15.0 | |
| GZU-4O-N | 15.0 | Δn (20° C., 589 nm) = 0.164 |
| UZU-3A-N | 8.0 | |
| CUZU-2-N | 9.0 | |
| CUZU-3-N | 9.0 | |
| CUZU-4-N | 9.0 | |
| HP-3N•F | 6.0 | |
| HP-4N•F | 6.0 | |
| HP-5N•F | 8.0 | |
| Σ | 100.0 | |

The resulting mixture CM-0 is filled into an electro optical test cell with interdigital electrodes on one substrate side. The electrode width is 10 μm, the distance between adjacent electrodes is 10 μm and the cell gap is also 10 μm. This test cell is evaluated electro-optically between crossed polarisers.

At low temperatures, the filled cell showed the typical texture of a chiral nematic mixture, with an optical transmission between crossed polarisers without applied voltage. On heating, at a temperature of 36° C. the mixture was optically isotropic, being dark between the crossed polarisers. This indicated the transition from the chiral nematic phase to the blue phase at 36° C. This temperature is called $T_1$ or $T_{trans}$.

Up to a temperature of 43° C. the cell shows a clear electro optical effect under applied voltage, for example at 38° C., applying a voltage of 46 V leads to a maximum of the optical transition. This temperature is called $T_2$ and the respective voltage is called $V_{max}$ or $V_{100}$. At a temperature of 43° C. the voltage needed for a visible electro-optical effect starts to increase strongly, indicating the transition from the blue phase to the isotropic phase at this temperature.

The temperature range ($\Delta T(BP)$), where the mixture can be used electro-optically in the blue phase is identified as ranging from about 36° C. to about 43° C., i.e. as being 7° wide (=$T_2$-$T_1$=43° C.–36° C.). The results are listed in table 2 below. Further the response times for switching on ($\tau_{on}$) and for switching off ($\tau_{off}$) are been determined. The response times decrease with increasing temperature above $T_1$ and the temperature at which both response times have fallen below 5 ms each is called $T_3$. This is the case in this comparative use example at a temperature of about 39.3° C. or slightly above. Thus, the range of usable flat behaviour i.e. the usable flat range ($\Delta T(FR)$), which is defined as $\Delta T(FR)=T_2-T_3$, in case $T_2 \geq T_3$ and $\Delta T(FR)=0$, in case $T_2<T_3$, is (43.0° C.-39.3° C.)=3.7° in this comparative use example.

Use-Example 1

In this use-example alternatively 10% of the respective compound of examples 1, 3 and 5, respectively, are solved each together with 5% of the chiral agent R-5011 in the achiral liquid crystal mixture H-0 used in the comparative use-example 1 described above. The resultant mixtures H-1 to H-3 have the compositions and properties shown in table 2.

TABLE 2

| Results | | | | |
|---|---|---|---|---|
| Use-Ex. # | C.E.-1-0 | 1-1 | 1-2 | 1-3 |
| Mixture # | CM-0 | H-1 | H-2 | H-3 |
| Cpd. of Ex. # | None | 1 | 2 | 3 |
| c(Cpd.)/% | 0 | | 10 | |
| c(R-5011)/% | 0 | | 5 | |
| Characteristic Temperatures | | | | |
| $T_2$/° C. | 43.0 | n.d. | n.d. | n.d. |
| $T_3$/° C. | 39.3 | n.d. | n.d. | n.d. |
| $T_1$/° C. | 36.0 | n.d. | n.d. | n.d. |
| $\Delta T(BP)$/° | 7.0 | n.d. | n.d. | n.d. |
| $\Delta T(FR)$/° | 3.7 | n.d. | n.d. | n.d. |
| Characteristic Voltages | | | | |
| $T_{op}$/° C. | 38.0 | n.d. | n.d. | n.d. |
| $V_{max}$/V | 46.0 | n.d. | n.d. | n.d. |
| $dV_{max}/dT/V/°$ | n.d. | n.d. | n.d. | n.d. |
| $dV_{max}/dT/V_0/°$ | n.d. | n.d. | n.d. | n.d. |

Remarks: n.d.: not determined.

The resulting mixtures H-1 to H-3 are filled into respective electro optical test cell like that used in the comparative use-example 1 and investigated as described there. The results are listed in table 2.

The invention claimed is:

1. Mesogenic medium comprising one or more mesogenic compounds, said one or more mesogenic compounds comprising two or more mesogenic groups at least one of which is bound via a single bond to an aromatic ring, two or three of said two or more mesogenic groups being bound to the ortho positions of an aromatic ring, wherein one or more of the compounds comprising two or more mesogenic groups bound via a single bond to the ortho positions of an aromatic ring is chiral, wherein in said aromatic ring one or two non-adjacent =CH— groups may be replaced by N and wherein said aromatic ring optionally may further be substituted, said mesogenic medium comprising one or more compounds of formula I

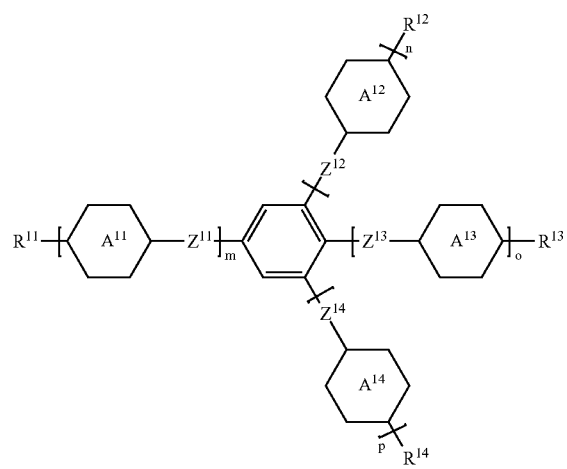

wherein
$R^{11}$ is alkyl, which is straight chain or branched, in which one or more non-adjacent $CH_2$ groups are optionally replaced, in each case independently from one another, by —O—, —S—, —NH—, —NR$^{01}$—, —SiR$^{01}$R$^{02}$—, —CO—, —OCO—O—, —S—CO—, —CO—S—, —CY$^{01}$=CY$^{01}$— or —C≡C— in such a manner that O and/or S atoms are not linked directly to one another, $R^{12}$, $R^{13}$ and $R^{14}$ are, independently of each other, H, F, Cl, CN, NCS, SF$_5$, SO$_2$CF$_3$ or alkyl, which is straight chain or branched, in which one or more non-adjacent $CH_2$ groups are optionally replaced, in each case independently from one another, by —O—, —S—, —NH—, —NR$^{01}$—, —SiR$^{01}$R$^{02}$—, —CO—, —OCO—O—, —S—CO—, —CO—S—, —CY$^{01}$=CY$^{01}$— or —C≡C— in such a manner that O and/or S atoms are not linked directly to one another,

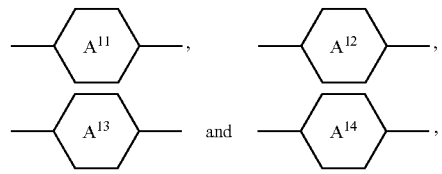

are independently of each other, and, in case one or more of them are occurring more than once, also these are in each occurrence, independently of each other, an aromatic and/or alicyclic ring, or a group comprising two or more fused aromatic or alicyclic rings, wherein these rings optionally contain one or more hetero atoms selected from N, O and/or S, and are optionally monosubstituted or polysubstituted by R, R has the meaning given for $R^{12}$, $Z^{11}$, $Z^{12}$, $Z^{13}$ and $Z^{14}$ are, independently of each other, and in case one or more of them are occurring more than once, also these are in each occurrence, independently of each other, —CO—O—, —O—CO—, —S—CO—, —CO—S—, —CO—NR$^{01}$—, —NR$^{01}$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CR$^{01}$—, —CR$^{01}$=CH—, —CY$^{01}$=CY$^{02}$—, —C≡C—, —(CH$_2$)$_4$—, —CH=CH—CO—O—, —O—CO—CH=CH— or a single bond, at least one of Z$^{12}$ or Z$^{13}$ is a single bond to the central phenyl ring, Y$^{01}$ and Y$^{02}$ are, independently of each other, F, Cl or CN, and alternatively one of them may be H, R$^{01}$ and R$^{02}$ are, independently of each other, H or alkyl with 1 to 12 C-atoms, m is 0, 1, 2, 3 or 4, n and o are, independently of each other, 1, 2, 3 or 4, and is 0, 1, 2, 3 or 4, and optionally the central phenyl ring may be substituted once or more times by halogen and/or R, and/or one or two non-adjacent =CH— groups may be replaced by N.

2. Medium according to claim 1, comprising one or more compounds of formula I wherein:

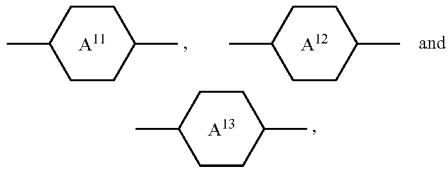

next to the central phenyl ring are an optionally substituted aromatic ring, and at least one of Z$^{11}$ to Z$^{13}$ next to the central aromatic ring is a single bond.

3. Mesogenic medium which is a light modulation medium, comprising one or more mesogenic compounds, said one or more mesogenic compounds comprising two or more mesogenic groups at least one of which is bound via a single bond to an aromatic ring, two or three of said two or more mesogenic groups being bound to the ortho positions of an aromatic ring, wherein in said aromatic ring one or two non-adjacent =CH— groups may be replaced by N and wherein said aromatic ring optionally may further be substituted, said mesogenic medium comprising one or more compounds of formula I

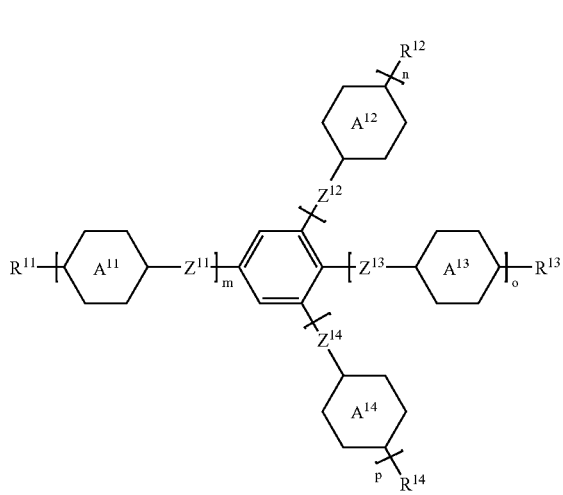

wherein

R$^{11}$, R$^{12}$, R$^{13}$ and R$^{14}$ are, independently of each other, H, F, Cl, CN, NCS, SF$_5$, SO$_2$CF$_3$ or alkyl, which is straight chain or branched, in which one or more non-adjacent CH$_2$ groups are optionally replaced, in each case independently from one another, by —O—, —S—, —NH—, —NR$^{01}$—, —SiR$^{01}$R$^{02}$—, —CO—, —OCO—O—, —S—CO—, —CO—S—, —CY$^{01}$=CY$^{01}$— or —C≡C— in such a manner that O and/or S atoms are not linked directly to one another,

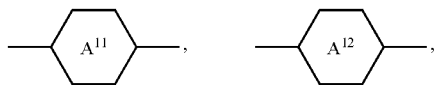

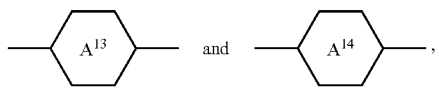

are independently of each other, and, in case one or more of them are occurring more than once, also these are in each occurrence, independently of each other, an aromatic and/or alicyclic ring, or a group comprising two or more fused aromatic or alicyclic rings, wherein these rings optionally contain one or more hetero atoms selected from N, O and/or S, and are optionally monosubstituted or polysubstituted by R, R has the meaning given for R$^{11}$, Z$^{11}$, Z$^{12}$, Z$^{13}$ and Z$^{14}$ are, independently of each other, and in case one or more of them are occurring more than once, also these are in each occurrence, independently of each other, —CO—O—, —O—CO—, —S—CO—, —CO—S—, —CO—NR$^{01}$—, —NR$^{01}$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CR$^{01}$—, —CR$^{01}$=CH—, —CY$^{01}$=CY$^{02}$—, —C≡C—, —(CH$_2$)$_4$—, —CH=CH—CO—O—, —O—CO—CH=CH— or a single bond, at least one of Z$^{12}$ or Z$^{13}$ is a single bond to the central phenyl ring, Y$^{01}$ and Y$^{02}$ are, independently of each other, F, Cl or CN, and alternatively one of them may be H, R$^{01}$ and R$^{02}$ are, independently of each other, H or alkyl with 1 to 12 C-atoms, m is 0, 1, 2, 3 or 4, n and o are, independently of each other, 1, 2, 3 or 4, and P is 0, 1, 2, 3 or 4 and optionally the central phenyl ring may be substituted once or more times by halogen and/or R, and/or one or two non-adjacent =CH— groups may be replaced by N.

4. Medium according to claim 3, which has a blue phase.

5. Light modulation element, comprising a medium according to claim 3.

6. In a light modulation element comprising a liquid crystalline medium, the improvement wherein the medium comprises one or more compounds of formula I

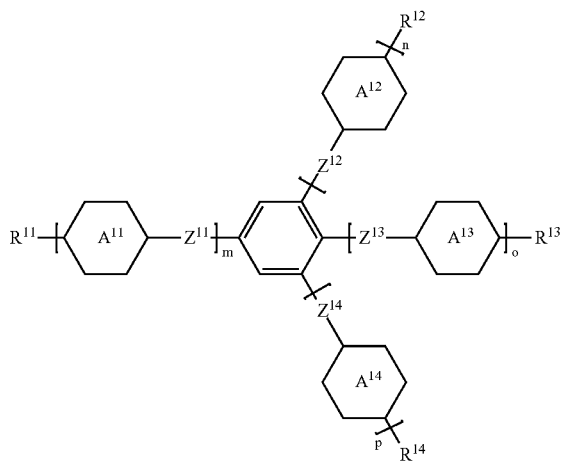

wherein
$R^{11}$, $R^{12}$, $R^{13}$ and $R^{14}$ are, independently of each other, H, F, Cl, CN, NCS, $SF_5$, $SO_2CF_3$ or alkyl, which is straight chain or branched, in which one or more non-adjacent $CH_2$ groups are optionally replaced, in each case independently from one another, by —O—, —S—, —NH—, —$NR^{O1}$—, —$SiR^{O1}R^{O2}$—, —CO—, —OCO—O—, —S—CO—, —CO—S—, —$CY^{O1}$=$CY^{O1}$— or —C≡C— in such a manner that O and/or S atoms are not linked directly to one another,

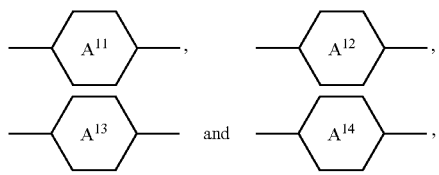

are independently of each other, and, in case one or more of them are occurring more than once, also these are in each occurrence, independently of each other, an aromatic and/or alicyclic ring, or a group comprising two or more fused aromatic or alicyclic rings, wherein these rings optionally contain one or more hetero atoms selected from N, O and/or S, and are optionally monosubstituted or polysubstituted by R,
R has the meaning given for $R^{11}$,
$Z^{11}$, $Z^{12}$, $Z^{13}$ and $Z^{14}$ are, independently of each other, and in case one or more of them are occurring more than once, also these are in each occurrence, independently of each other, —CO—O—, —O—CO—, —S—CO—, —CO—S—, —CO—$NR^{O1}$—, —$NR^{O1}$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^{O1}$—, —$CR^{O1}$=CH—, —$CY^{O1}$=$CY^{O2}$—, —C≡C—, —$(CH_2)_4$—, —CH=CH—CO—O—, —O—CO—CH=CH— or a single bond, at least one of $Z^{12}$ or $Z^{13}$ is a single bond to the central phenyl ring,
$Y^{O1}$ and $Y^{O2}$ are, independently of each other, F, Cl or CN, and alternatively one of them may be H,
$R^{O1}$ and $R^{O2}$ are, independently of each other, H or alkyl with 1 to 12 C-atoms, m is 0, 1, 2, 3 or 4, preferably 1, 2, or 3,
n and o are, independently of each other, 1, 2, 3 or 4, and
P is 0, 1, 2, 3 or 4
optionally the central phenyl ring may be substituted once or more times by halogen and/or R and/or one or two non-adjacent =CH— groups may be replaced by N, and $R^{11}$ to $R^{14}$ are not simultaneously H or simultaneously F.

7. Electro-optical display, comprising a mesogenic medium which comprises one or more mesogenic compounds, said one or more mesogenic compounds comprising two or more mesogenic groups at least one of which is bound via a single bond to an aromatic ring, two or three of said two or more mesogenic groups being bound to the ortho positions of an aromatic ring, wherein in said aromatic ring one or two non-adjacent =CH— groups may be replaced by N and wherein said aromatic ring optionally may further be substituted, said mesogenic medium comprising one or more compounds of formula I

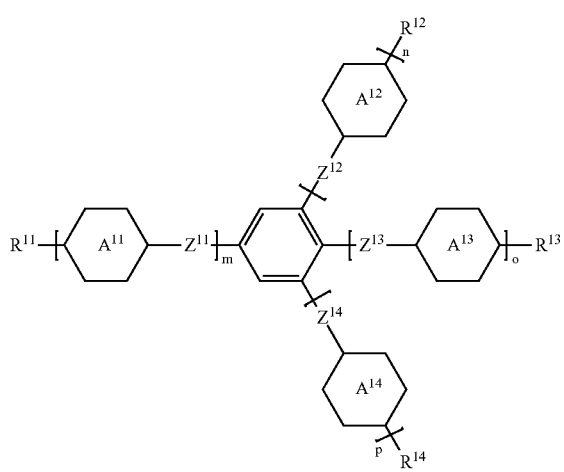

wherein
$R^{11}$, $R^{12}$, $R^{13}$ and $R^{14}$ are, independently of each other, H, F, Cl, CN, NCS, $SF_5$, $SO_2CF_3$ or alkyl, which is straight chain or branched, in which one or more non-adjacent $CH_2$ groups are optionally replaced, in each case independently from one another, by —O—, —S—, —NH—, —$NR^{O1}$—, —$SiR^{O1}R^{O2}$—, —CO—, —OCO—O—, —S—CO—, —CO—S—, —$CY^{O1}$=$CY^{O1}$— or —C≡C— in such a manner that O and/or S atoms are not linked directly to one another,

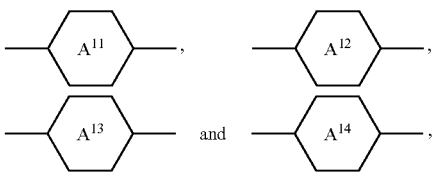

are independently of each other, and, in case one or more of them are occurring more than once, also these are in each occurrence, independently of each other, an aromatic and/or alicyclic ring, or a group comprising two or more fused aromatic or alicyclic rings, wherein these rings optionally contain one or more hetero atoms selected from N, O and/or S, and are optionally monosubstituted or polysubstituted by R, R has the meaning given for $R^{11}$, $Z^{11}$, $Z^{12}$, $Z^{13}$ and $Z^{14}$ are, independently of each other, and in case one or more of them are occurring more than once, also these are in each occurrence, independently of each other, —CO—O—, —O—CO—, —S—CO—, —CO—S—, —CO—$NR^{01}$—, —$NR^{01}$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=$CR^{01}$—, —$CR^{01}$=CH—, —$CY^{01}$=$CY^{02}$—, —C≡C—, —(CH$_2$)$_4$—, —CH=CH—CO—O—, —O—CO—CH=CH— or a single bond, at least one of $Z^{12}$ or $Z^{13}$ is a single bond to the central phenyl ring, $Y^{01}$ and $Y^{02}$ are, independently of each other, F, Cl or CN, and alternatively one of them may be H, $R^{01}$ and $R^{02}$ are, independently of each other, H or alkyl with 1 to 12 C-atoms, m is 0, 1, 2, 3 or 4, n and o are, independently of each other, 1, 2, 3 or 4, and P is 0, 1, 2, 3 or 4 and optionally the central phenyl ring may be substituted once or more times by halogen and/or R, and/or one or two non-adjacent =CH— groups may be replaced by N.

* * * * *

UNITED STATES PATENT AND TRADEMARK OFFICE
CERTIFICATE OF CORRECTION

| | | |
|---|---|---|
| PATENT NO. | : 7,914,859 B2 | Page 1 of 1 |
| APPLICATION NO. | : 11/814631 | |
| DATED | : March 29, 2011 | |
| INVENTOR(S) | : Kirsch et al. | |

It is certified that error appears in the above-identified patent and that said Letters Patent is hereby corrected as shown below:

Column 79, line 14 reads "n and o are, independently of each other, 1, 2, 3 or 4, and is"

Should read --n and o are, independently of each other, 1, 2, 3 or 4, and--.

Column 79, line 15 reads "0, 1, 2, 3 or 4, and optionally the central phenyl ring may"

Should read --p is 0, 1, 3 or 4, and optionally the central phenyl ring may--.

Signed and Sealed this
Sixth Day of March, 2012

David J. Kappos
*Director of the United States Patent and Trademark Office*